(12) United States Patent
Kimura et al.

(10) Patent No.: US 12,050,372 B2
(45) Date of Patent: Jul. 30, 2024

(54) POLARIZATION CONVERSION ELEMENT

(71) Applicant: Japan Display Inc., Tokyo (JP)

(72) Inventors: Shunichi Kimura, Tokyo (JP); Toshiharu Matsushima, Tokyo (JP)

(73) Assignee: JAPAN DISPLAY INC., Tokyo (JP)

(*) Notice: Subject to any disclaimer, the term of this patent is extended or adjusted under 35 U.S.C. 154(b) by 0 days.

(21) Appl. No.: 18/084,552

(22) Filed: Dec. 20, 2022

(65) Prior Publication Data

US 2023/0122427 A1 Apr. 20, 2023

Related U.S. Application Data

(63) Continuation of application No. PCT/JP2021/015049, filed on Apr. 9, 2021.

(30) Foreign Application Priority Data

Jun. 22, 2020 (JP) ................ 2020-106893

(51) Int. Cl.
| | |
|---|---|
| *G02F 1/01* | (2006.01) |
| *G02F 1/1333* | (2006.01) |
| *G02F 1/1337* | (2006.01) |
| *G02F 1/1343* | (2006.01) |
| *G02F 1/137* | (2006.01) |

(52) U.S. Cl.
CPC .......... *G02F 1/0136* (2013.01); *G02F 1/1337* (2013.01); *G02F 1/134372* (2021.01); *G02F 1/134381* (2021.01); *G02F 1/13706* (2021.01); *G02F 1/13712* (2021.01)

(58) Field of Classification Search
CPC ................ G02F 1/0136; G02F 1/1337; G02F 1/134372; G02F 1/134381; G02F 1/13706; G02F 1/13712; G02F 1/134309; G02F 1/134363
See application file for complete search history.

(56) References Cited

U.S. PATENT DOCUMENTS

| | | | |
|---|---|---|---|
| 2009/0109391 A1 | 4/2009 | Ito et al. | |
| 2018/0120562 A1* | 5/2018 | Yata | ................. G02F 1/133528 |

FOREIGN PATENT DOCUMENTS

| | | |
|---|---|---|
| CN | 101206353 A | 6/2008 |
| JP | 2009-103952 A | 5/2009 |
| | (Continued) | |

OTHER PUBLICATIONS

Translation of written opinion (Year: 2021).*
(Continued)

*Primary Examiner* — Tracie Y Green
(74) *Attorney, Agent, or Firm* — XSENSUS LLP

(57) ABSTRACT

According to one embodiment, a polarization conversion element includes a first substrate including a first plane electrode and a first control electrode, a second substrate, and a liquid crystal layer. The first control electrode comprises a first strip electrode, a second strip electrode, a third strip electrode, and a first common electrode. The first strip electrode and the first common electrode are orthogonal to each other, respective extension directions of the first to third strip electrodes are different from each other, and an angle formed by the first strip electrode and the third strip electrode is greater than an angle formed by the first strip electrode and the second strip electrode.

14 Claims, 21 Drawing Sheets

(56) References Cited

FOREIGN PATENT DOCUMENTS

| | | |
|---|---|---|
| JP | 2009-288604 A | 12/2009 |
| JP | 2018-30522 A | 3/2018 |

OTHER PUBLICATIONS

International Search Report and Written Opinion mailed on Jun. 22, 2021, received for PCT Application PCT/JP2021/015049, filed on Apr. 9, 2021, 10 pages including English Translation.

\* cited by examiner

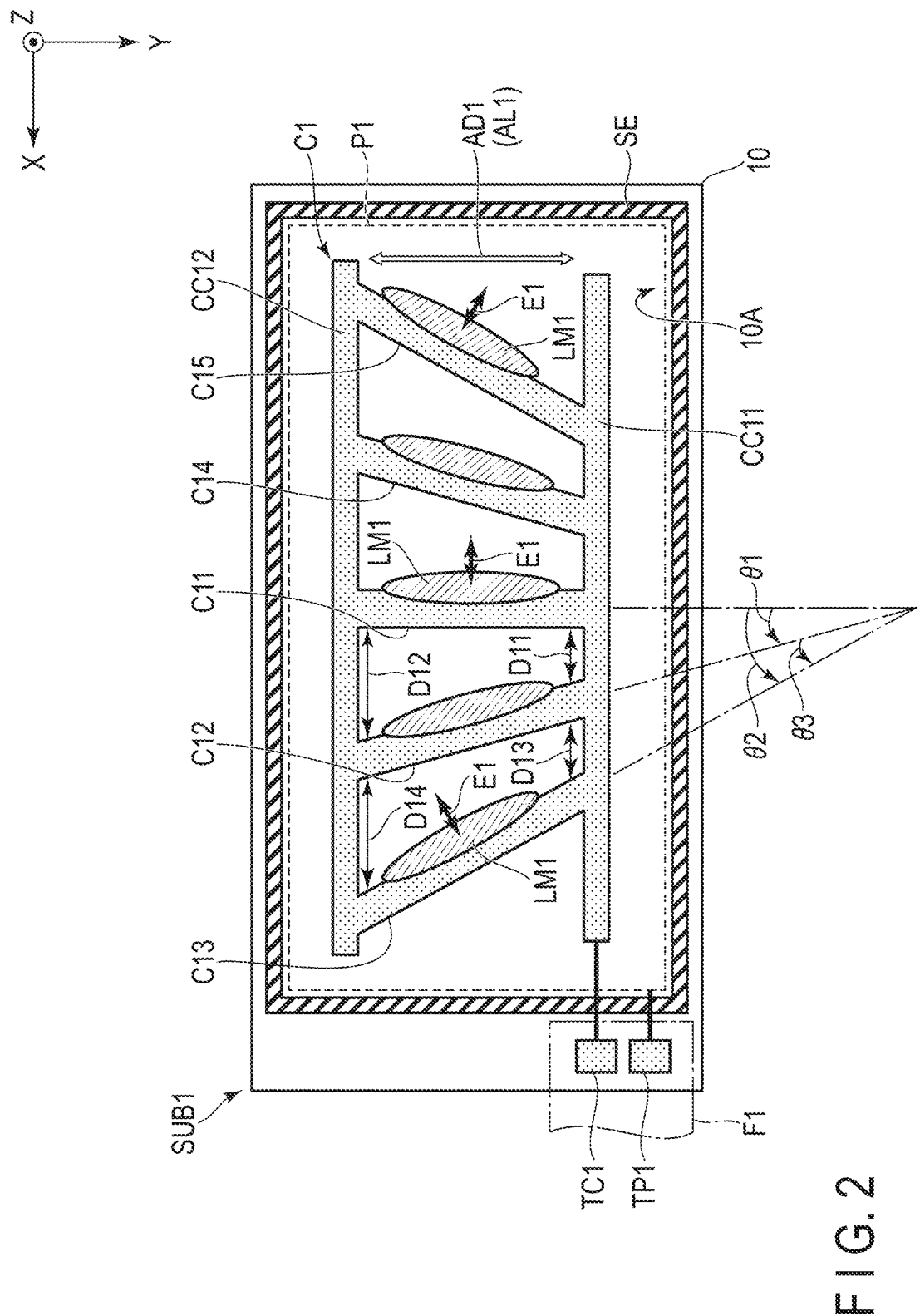
F I G. 2

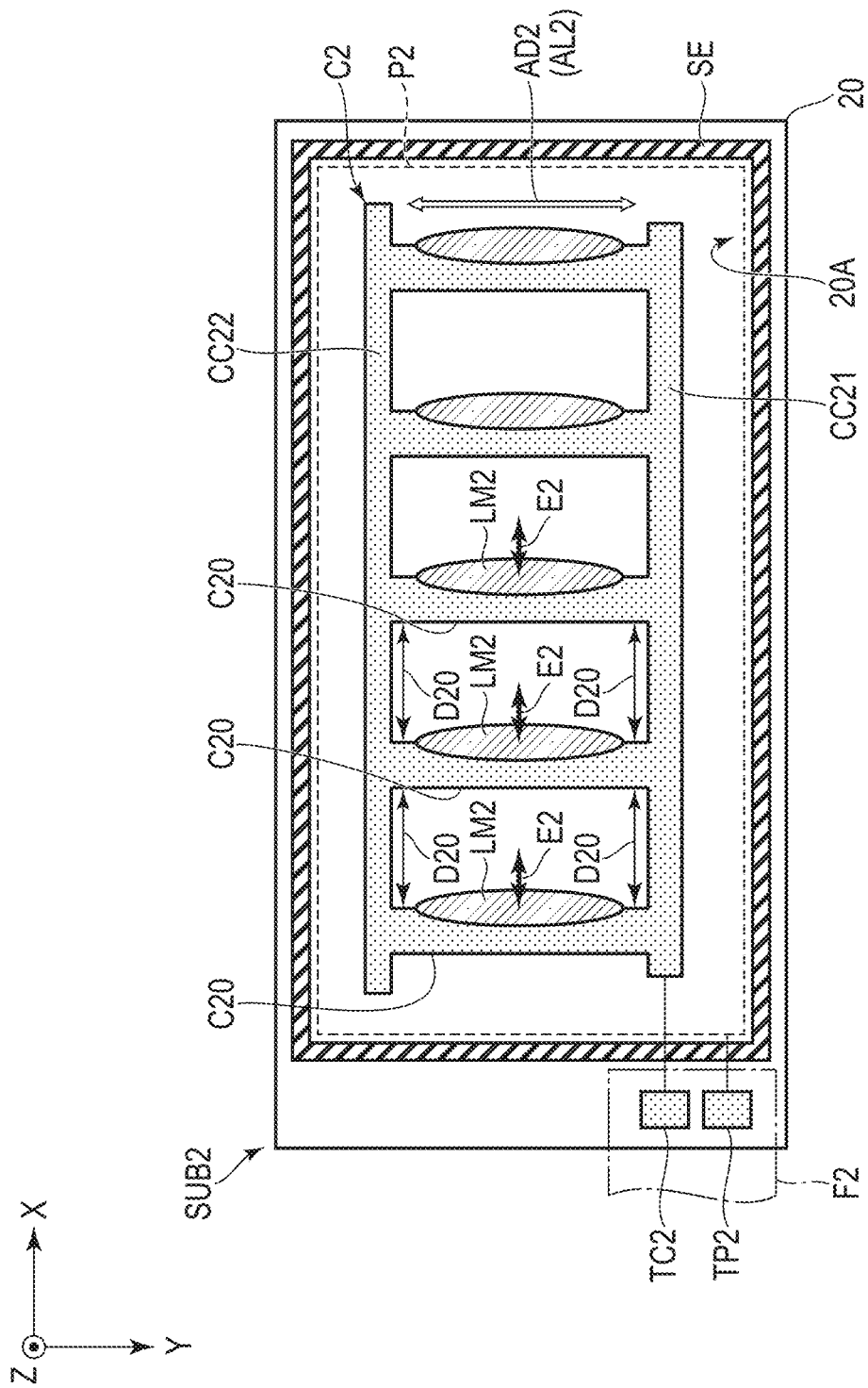
F I G. 3

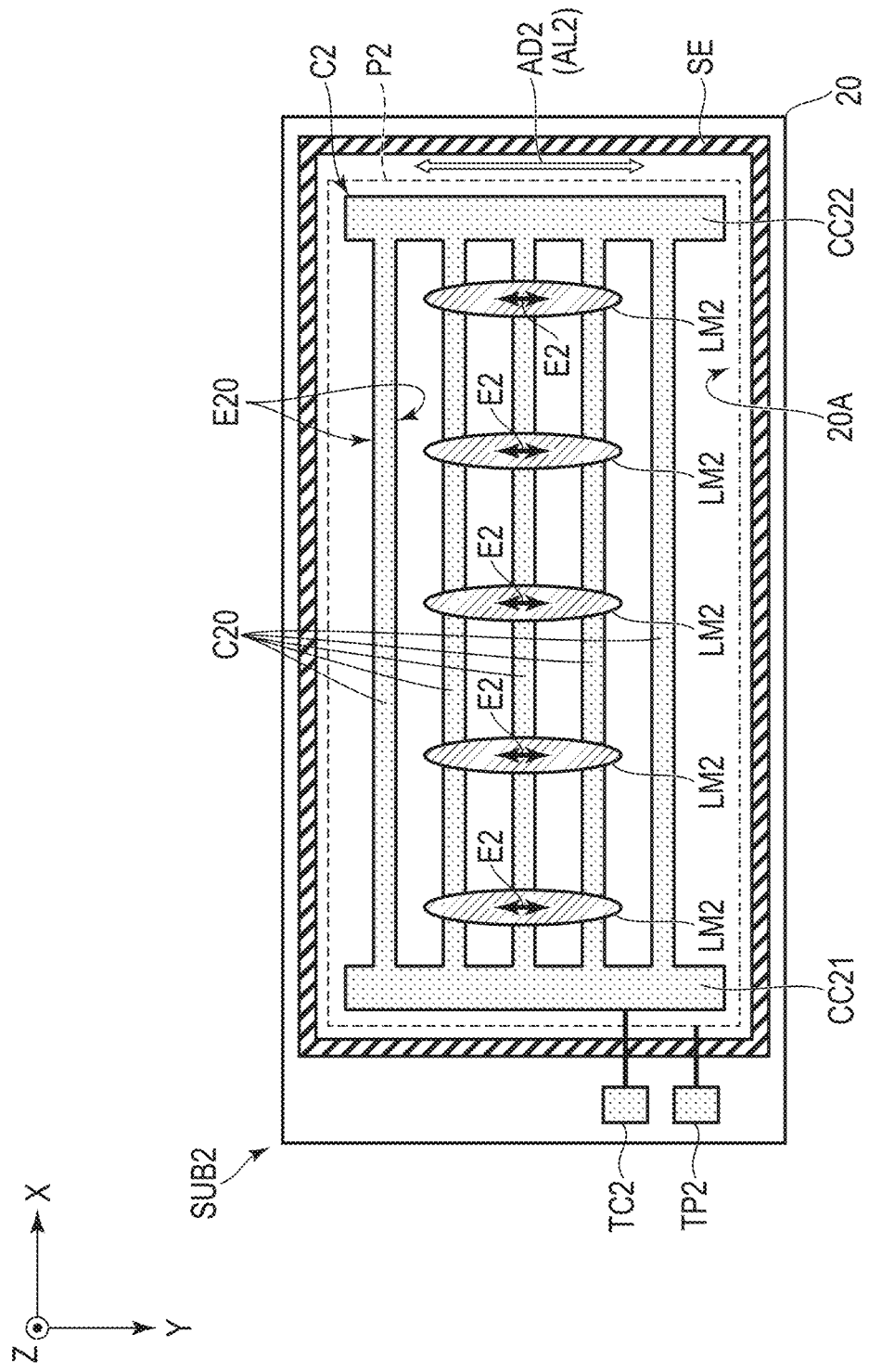
F I G. 10

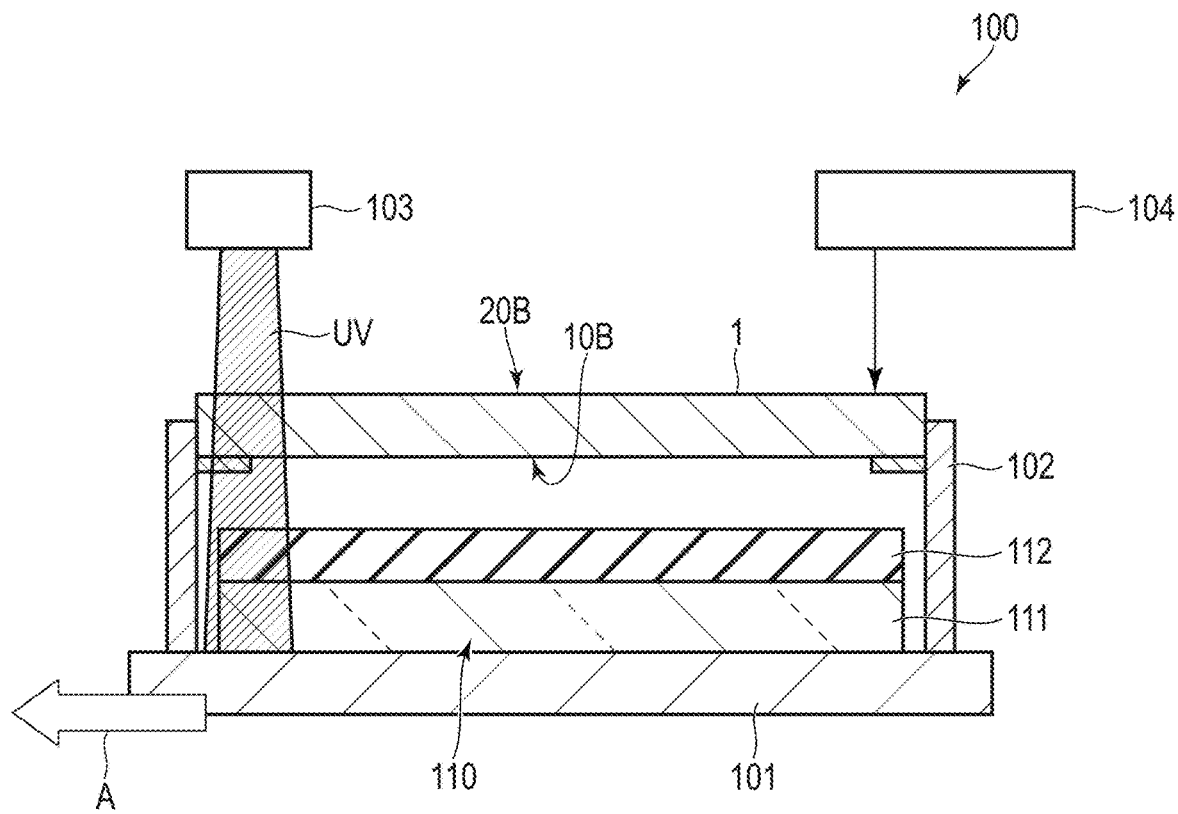
F I G. 22
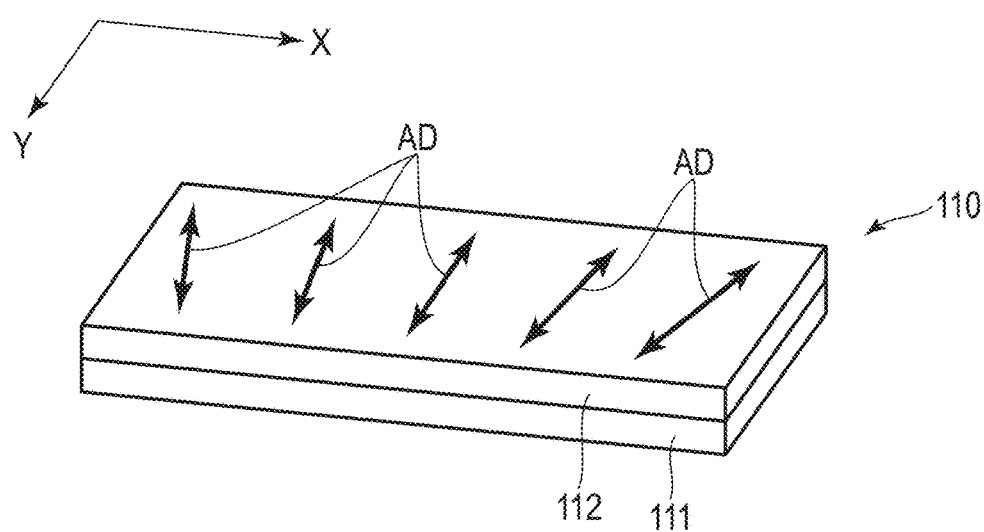
F I G. 23

POLARIZATION CONVERSION ELEMENT

CROSS-REFERENCE TO RELATED APPLICATIONS

This application is a Continuation Application of PCT Application No. PCT/JP2021/015049, filed Apr. 9, 2021 and based upon and claiming the benefit of priority from Japanese Patent Application No. 2020-106893, filed Jun. 22, 2020, the entire contents of all of which are incorporated herein by reference.

FIELD

Embodiments described herein relate generally to a polarization conversion element.

BACKGROUND

In recent years, various head-up display devices have been proposed. For example, a display device comprising a display and a combiner having a reflective surface which reflects display light emitted from the display has been proposed. In such a display device, it is required that the polarization axis of display light be rotated in a plane according to, for example, the shape of the reflective surface.

BRIEF DESCRIPTION OF THE DRAWINGS

FIG. 2 is a plan view showing a configuration example of a first substrate SUB1 shown in FIG. 1.

FIG. 3 is a plan view showing a configuration example of a second substrate SUB2 shown in FIG. 1.

FIG. 10 is a plan view showing a configuration example of the second substrate SUB2.

FIG. 22 is a diagram for explaining an application example of the polarization conversion element 1.

FIG. 23 is a diagram showing an example of an object 110 subjected to alignment treatment by an alignment treatment device 100 shown in FIG. 22.

DETAILED DESCRIPTION

Figure 1:
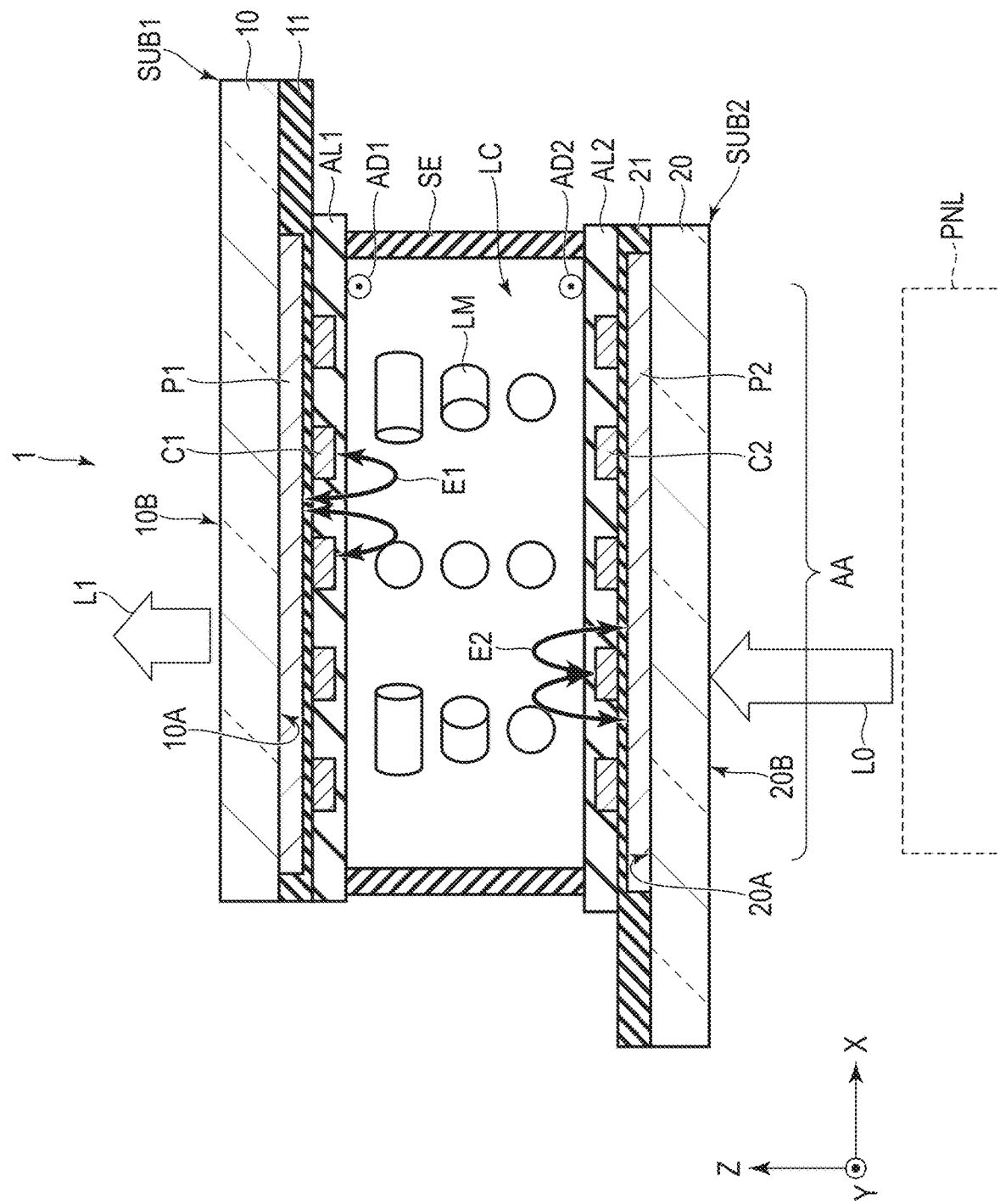
FIG. 1 is a cross-sectional view showing a configuration example of a polarization conversion element 1.

In general, according to one embodiment, a polarization conversion element comprises: a first substrate comprising a first transparent substrate having a first inner surface and a first outer surface, a first plane electrode disposed on the first inner surface, a first insulating film covering the first plane electrode, a first control electrode disposed on the first insulating film, and a first alignment film covering the first control electrode; a second substrate comprising a second transparent substrate having a second inner surface and a second outer surface, and a second alignment film; and a liquid crystal layer disposed between the first substrate and the second substrate. The first control electrode comprises a first strip electrode, a second strip electrode separated from the first strip electrode, a third strip electrode separated from the first strip electrode and the second strip electrode, and a first common electrode formed in strip and connected to one end side of each of the first to third strip electrodes. The first strip electrode and the first common electrode are orthogonal to each other. The second strip electrode is located between the first strip electrode and the third strip electrode. Respective extension directions of the first to third strip electrodes are different from each other. An angle formed by the extension direction of the first strip electrode and the extension direction of the third strip electrode is greater than an angle formed by the extension direction of the first strip electrode and the extension direction of the second strip electrode.

According to another embodiment, a polarization conversion element comprising: a first substrate comprising a first transparent substrate having a first inner surface and a first outer surface, a first plane electrode disposed on the first inner surface, a first insulating film covering the first plane electrode, a first control electrode disposed on the first insulating film, and a first alignment film covering the first control electrode; a second substrate comprising a second transparent substrate having a second inner surface and a second outer surface, and a second alignment film; and a liquid crystal layer held between the first substrate and the second substrate. In an on state where a potential difference arises between the first plane electrode and the first control electrode, the liquid crystal layer comprises a first area including a liquid crystal molecule aligned twistedly clockwise and a second area including a liquid crystal molecule aligned twistedly counterclockwise in an area where the first plane electrode and the first control electrode overlap.

According to an embodiment, a polarization conversion element which transmits light having a polarization axis in a desired direction in a plane can be provided.

Embodiments will be described hereinafter with reference to the drawings. The disclosure is merely an example, and proper changes within the spirit of the invention which are easily conceivable by a person having ordinary skill in the art are included in the scope of the present invention as a matter of course. In addition, in order to make the description clearer, the width, thickness, shape, etc., of each portion may be illustrated schematically in the drawings, rather than as an accurate representation of what is implemented. They are mere examples and do not limit the interpretation of the present invention. In the specification and drawings, the structural elements that have the same or similar functions as or to those described in connection with preceding drawings are denoted by the same reference symbols, and a detailed description thereof may be omitted as appropriate.

First Embodiment

FIG. 1 is a cross-sectional view showing a configuration example of a polarization conversion element 1. In the cross-sectional view of the polarization conversion element 1 shown in the figure, a first direction X, a second direction Y, and a third direction Z are orthogonal to each other but may cross at an angle other than 90°. The first direction X and the second direction Y correspond to, for example, directions parallel to a substrate included in the polarization conversion element 1, and the third direction Z corresponds to the thickness direction of the polarization conversion element 1.

The polarization conversion element 1 is, for example, a liquid crystal element, and comprises a first substrate SUB1, a second substrate SUB2, and a liquid crystal layer LC. The liquid crystal layer LC is held between the first substrate SUB1 and the second substrate SUB2, and is sealed by a sealant SE. The polarization conversion element 1 described here, for example, controls the alignment state of liquid crystal molecules LM included in the liquid crystal layer LC by an electric field along a main surface of a substrate. The main surface of the substrate here corresponds to an X-Y plane defined by the first direction X and the second direction Y.

The first substrate SUB1 is located on the front surface side of the second substrate SUB2. The first substrate SUB1 comprises a first insulating substrate 10, a first plane electrode P1, a first insulating film 11, a first control electrode C1, and a first alignment film AL1. The first insulating substrate 10 comprises a first inner surface 10A and a first outer surface 10B which are substantially parallel to the X-Y plane. The first plane electrode P1 is disposed on the first inner surface 10A. The first insulating film 11 covers the first plane electrode P1. The first control electrode C1 is disposed on a surface of the first insulating film 11. The first alignment film AL1 covers the first control electrode C1.

The second substrate SUB2 comprises a second insulating substrate 20, a second plane electrode P2, a second insulating film 21, a second control electrode C2, and a second alignment film AL2. The second insulating substrate 20 comprises a second inner surface 20A and a second outer surface 20B which are substantially parallel to the X-Y plane. The second plane electrode P2 is disposed on the second inner surface 20A. The second insulating film 21 covers the second plane electrode P2. The second control electrode C2 is disposed on a surface of the second insulating film 21. The second alignment film AL2 covers the second control electrode C2. The first alignment film AL1 and the second alignment film AL2 contact the liquid crystal layer LC.

The first insulating substrate 10 and the second insulating substrate 20 are transparent substrates, for example, glass substrates or resin substrates. In addition, the first insulating substrate 10 and the second insulating substrate 20 may have flexibility. The first insulating film 11 and the second insulating film 21 are transparent inorganic insulating films of, for example, silicon nitride, but may be organic insulating films. The first control electrode C1, the first plane electrode P1, the second control electrode C2, and the second plane electrode P2 are transparent electrodes formed of transparent conductive materials such as indium tin oxide (ITO) or indium zinc oxide (IZO).

The liquid crystal layer LC is composed of, for example, negative liquid crystal materials having negative dielectric anisotropy. The first alignment film AL1 and the second alignment film AL2 are horizontal alignment films having alignment restriction force substantially parallel to the X-Y plane. An alignment treatment direction AD1 of the first alignment film AL1 and an alignment treatment direction AD2 of the second alignment film AL2 are substantially parallel to each other, and for example, are both substantially parallel to the second direction Y. The alignment treatment here may be rubbing treatment or optical alignment treatment, or may be conducted by other treatment methods (such as an oblique vapor deposition method).

For example, a refractive anisotropy Δn and a thickness d are set to satisfy the relationship:

$$\lambda < 2 * \Delta n * d,$$

where λ is a wavelength of ultraviolet rays when the first alignment film AL1 and the second alignment film AL2 are subjected to optical alignment treatment, Δn is the refractive anisotropy of the liquid crystal layer LC, and d is a thickness in the third direction Z of the liquid crystal layer LC.

In the above-described polarization conversion element 1, the second outer surface 20B corresponds to a plane of incidence of linearly polarized light L0, and the first outer surface 10B corresponds to a plane of emission of linearly polarized light L1. In an effective area AA where linearly polarized light L0 is transmitted, the first control electrode C1 overlaps the first plane electrode P1 with the first insulating film 11 interposed therebetween, and the second control electrode C2 overlaps the second plane electrode P2 with the second insulating film 21 interposed therebetween.

Each of the first plane electrode P1 and the second plane electrode P2 is disposed to extend over substantially all the effective area AA, and is a single sheet electrode which does not have a slit or the like. Each of the first control electrode C1 and the second control electrode C2 is disposed to extend over substantially all the effective area AA, and comprises strip electrodes (or slits). Details of the first control electrode C1 and the second control electrode C2 will be described later.

The first control electrode C1 and the first plane electrode P1 are controlled to apply a predetermined drive voltage to the liquid crystal layer LC near the first substrate SUB1. The second control electrode C2 and the second plane electrode P2 are controlled to apply a predetermined drive voltage to the liquid crystal layer LC near the second substrate SUB2.

An electric field E1 produced between the first control electrode C1 and the first plane electrode P1 and an electric field E2 produced between the second control electrode C2 and the second plane electrode P2 both reach to the liquid crystal layer LC. The electric field E1 acts on the liquid crystal molecules LM to cause the liquid crystal molecules LM near the first substrate SUB1 to be aligned in a direction different from the initial alignment direction. On the other hand, the electric field E2 acts on the liquid crystal molecules LM to cause the liquid crystal molecules LM near the second substrate SUB2 to be maintained in the initial alignment state.

Thus, in part of the area of the liquid crystal layer LC, the liquid crystal molecules LM arranged in the third direction Z are aligned twistedly. An area including the twistedly aligned liquid crystal molecules LM of the liquid crystal layer LC has optical rotatory power to rotate the polarization axis of linearly polarized light. In the example shown in FIG. 1, the initial alignment direction of the liquid crystal molecules LM is substantially parallel to the second direction Y.

In a display device comprising the above-described polarization conversion element 1, a display panel PNL indicated by a broken line is disposed on the back surface side of the polarization conversion element 1. That is, the display panel PNL and the polarization conversion element 1 are opposed in the third direction Z. The second substrate SUB2 is located between the display panel PNL and the first substrate SUB1. The display panel PNL comprises, for example, a polarizer and emits linearly polarized light L0 toward the second substrate SUB2. The polarization conversion element 1 emits linearly polarized light L1 obtained by rotating the polarization axis of linearly polarized light L0, which is incident light, to a desired angle.

FIG. 2 is a plan view showing a configuration example of the first substrate SUB1 shown in FIG. 1. FIG. 2 shows main parts on the first inner surface 10A side of the first insulating substrate 10, and liquid crystal molecules LM1 located near the first substrate SUB1. The first control electrode C1 is disposed in an inner area surrounded by the sealant SE, and overlaps the first plane electrode P1 indicated by a broken line.

The first control electrode C1 comprises strip electrodes C11, C12, C13, . . . and strip common electrodes CC11 and CC12. The common electrodes CC11 and CC12 each extend in the first direction X and are arranged in the second direction Y with a distance between them. The strip electrodes C11, C12, C13, . . . are located between the common electrode CC11 and the common electrode CC12, and are arranged in the first direction X with distances between them.

The strip electrode (first strip electrode) C11 extends in the second direction Y and is orthogonal to the common electrodes CC11 and CC12. In the example shown in FIG. 2, the strip electrode C11 is located substantially at a center in the first direction X in the first control electrode C1. The extension direction of the strip electrode C11 is substantially parallel to the alignment treatment direction AD1 of the first alignment film AL1 or the initial alignment direction of the liquid crystal molecules LM1.

The strip electrode (second strip electrode) C12 is separated from the strip electrode C11. The strip electrode (third strip electrode) C13 is separated from the strip electrodes C11 and C12. The strip electrode C13 is located near the outer edge of the first control electrode C1. In the first direction X, the strip electrode C12 is located between the strip electrode C11 and the strip electrode C13.

One end side of each of the strip electrodes C11, C12, C13, . . . is connected to the common electrode (first common electrode) CC11 with distances between them. The other end side of each of the strip electrodes C11, C12, C13, . . . is connected to the common electrode CC12 with distances between them.

The strip electrodes C11, C12, C13, . . . extend in directions different from each other in the X-Y plane. The strip electrodes C12 and C13 extend in directions different from the first direction X and the second direction Y in the X-Y plane. The extension direction of the strip electrode C12 is different from the extension direction of the strip electrode C13. The extension directions of the strip electrodes C12 and C13 are directions different from the extension direction of the strip electrode C11 (second direction Y), the extension directions of the common electrodes CC11 and CC12 (first direction X), and the alignment treatment direction AD1. Thus, each of the strip electrodes C12 and C13 crosses the common electrodes CC11 and CC12 at angles different from 90°.

When the extension direction of the strip electrode C11 (second direction Y) is regarded as a reference direction, an angle $\theta 1$ formed by the extension direction of the strip electrode C11 and the extension direction of the strip electrode C12 is smaller than an angle $\theta 2$ formed by the extension direction of the strip electrode C11 and the extension direction of the strip electrode C13 ($\theta 1 < \theta 2$). In other words, when the angle $\theta 1$ is regarded as the angle of inclination of the strip electrode C12 and the angle $\theta 2$ is regarded as the angle of inclination of the strip electrode C13, the angle of inclination of the strip electrode C13 located away from the strip electrode C11 is greater than the angle of inclination of the strip electrode C12 located near the strip electrode C11. That is, in the first control electrode C1, the angle of inclination of a strip electrode located near the center in the first direction X is small and is substantially zero degrees. In contrast, in the first control electrode C1, the angle of inclination of a strip electrode located near the outer edge in the first direction X is greater than the angle of inclination of the strip electrode located near the center.

An angle $\theta 3$ formed by the extension direction of the strip electrode C12 and the extension direction of the strip electrode C13 is equal to the angle $\theta 1$. For example, the angles $\theta 1$ and $\theta 3$ are 0.5°.

The description here focuses on the distances between the adjacent strip electrodes in the first direction X. A distance D11 between the strip electrode C11 and the strip electrode C12 at a position near the common electrode CC11 is smaller than a distance D12 between the strip electrode C11 and the strip electrode C12 at a position near the common electrode CC12 (D11<D12).

Similarly, a distance D13 between the strip electrode C12 and the strip electrode C13 at a position near the common electrode CC11 is smaller than a distance D14 between the strip electrode C12 and the strip electrode C13 at a position near the common electrode CC12 (D13<D14). That is, the distance between the strip electrode C11 and the strip electrode C12 and the distance between the strip electrode C12 and the strip electrode C13 become greater in a direction away from the common electrode CC11, and become greatest near the common electrode CC12.

While the part on the left of the strip electrode C11 in FIG. 2 has been described here, the part on the right of the strip electrode C11 in FIG. 2 also has the same configuration as the left part. That is, the above-described first control electrode C1 is formed to have line symmetry with respect to the strip electrode C11 as its central axis. The strip electrode C14 and the strip electrode C12 have line symmetry, and the strip electrode C15 and the strip electrode C13 have line symmetry.

In addition, the first control electrode C1 shown in FIG. 2 may comprise another strip electrode between the strip electrodes shown in the figure. In the explanation of FIG. 2, the distances D11 to D14 are not necessarily the widths of the areas where the strip electrodes are not provided, but correspond to the distances between strip electrodes extending in different directions.

The first control electrode C1 and the first plane electrode P1 are connected to terminals TC1 and TP1 by lines drawn out of the sealant SE, respectively. A flexible printed circuit F1 indicated by an alternate long and short dashed line is electrically connected to the terminals TC1 and TP1, and supplies a voltage to be applied to each of the first control electrode C1 and the first plane electrode P1.

In the above-described first substrate SUB1, the alignment treatment direction AD1 of the first alignment film AL1 or the initial alignment direction of the liquid crystal molecules LM1 is set to the second direction Y. In an on state where a potential difference arises between the first control electrode C1 and the first plane electrode P1, the electric field E1 which is substantially orthogonal to each of the extension directions of the strip electrodes (or the edges of the strip electrodes) is formed in the X-Y plane. The liquid crystal molecules LM1 are aligned to make their major axes substantially orthogonal to the electric field E1. That is, in the on state, the liquid crystal molecules LM1 are aligned to make their major axes extend in the respective extension directions of the strip electrodes in planar view.

Since the first control electrode C1 comprises the strip electrodes extending in directions different from each other as described above, the alignment directions of the liquid crystal molecules LM differ between the areas of the X-Y plane. In the example shown in FIG. 2, the major axis of the liquid crystal molecule LM1 located substantially at the center of the first control electrode C1 is substantially parallel to the second direction Y, and the major axes of the liquid crystal molecules LM1 located at the outer edge of the first control electrode C1 incline with respect to the second direction Y. In addition, the liquid crystal molecules LM1 overlapping the first control electrode C1 are aligned in a state of being bilaterally symmetrical with respect to the strip electrode C11.

FIG. 3 is a plan view showing a configuration example of the second substrate SUB2 shown in FIG. 1. FIG. 3 shows main parts on the second inner surface 20A side of the second insulating substrate 20 and liquid crystal molecules LM2 located near the second substrate SUB2. The second control electrode C2 is disposed in an inner area surrounded by the sealant SE, and overlaps the second plane electrode P2 indicated by a broken line.

The second control electrode C2 comprises strip electrodes C20 and strip common electrodes CC21 and CC22. The common electrodes CC21 and CC22 each extend in the first direction X, and are arranged in the second direction Y with a distance between them. The strip electrodes C20 are located between the common electrode CC21 and the common electrode CC22, and are arranged in the first direction X with distances between them.

Each of the strip electrodes C20 extends in the second direction Y and is orthogonal to the common electrodes CC21 and CC22. That is, the respective extension directions of the strip electrodes C20 are parallel to each other. In addition, the extension directions of the strip electrodes C20 are parallel to the extension direction of the strip electrode C11 of the first control electrode C1 shown in FIG. 2, and cross the extension directions of the strip electrodes C12 and C13. The extension directions of the strip electrodes C20 are parallel to the alignment treatment direction AD2 of the second alignment film AL2 or the initial alignment direction of the liquid crystal molecules LM2.

One end side of each of the strip electrodes C20 is connected to the common electrode (second common electrode) CC21 with distances between them. The other end side of each of the strip electrodes C20 is connected to the common electrode CC22 with distances between them.

A distance D20 between the adjacent strip electrodes C20 in the first direction X is constant. That is, the distance D20 between the strip electrodes C20 at a position near the common electrode CC21 is equal to the distance D20 between the strip electrodes C20 at a position near the common electrode CC22.

The second control electrode C2 and the second plane electrode P2 are connected to terminals TC2 and TP2 by lines drawn out of the sealant SE, respectively. A flexible printed circuit F2 indicated by an alternate long and short dashed line is electrically connected to the terminals TC2 and TP2, and supplies a voltage to be applied to each of the second control electrode C2 and the second plane electrode P2.

In the above-described second substrate SUB2, the alignment treatment direction AD2 of the second alignment film AL2 or the initial alignment direction of the liquid crystal molecules LM2 is set to the second direction Y. In an on state where a potential difference arises between the second control electrode C2 and the second plane electrode P2, the electric field E2 which is substantially orthogonal to each of the extension directions of the strip electrodes (or the edges of the strip electrodes) is formed in the X-Y plane.

Since the strip electrodes of the second control electrode C2 extend parallel to each other as described above, the alignment directions of the liquid crystal molecules LM2 are uniform in the areas of the X-Y plane. That is, the major axes of the liquid crystal molecules LM2 overlapping the second control electrode C2 are all substantially parallel to the second direction Y.

Figure 4:
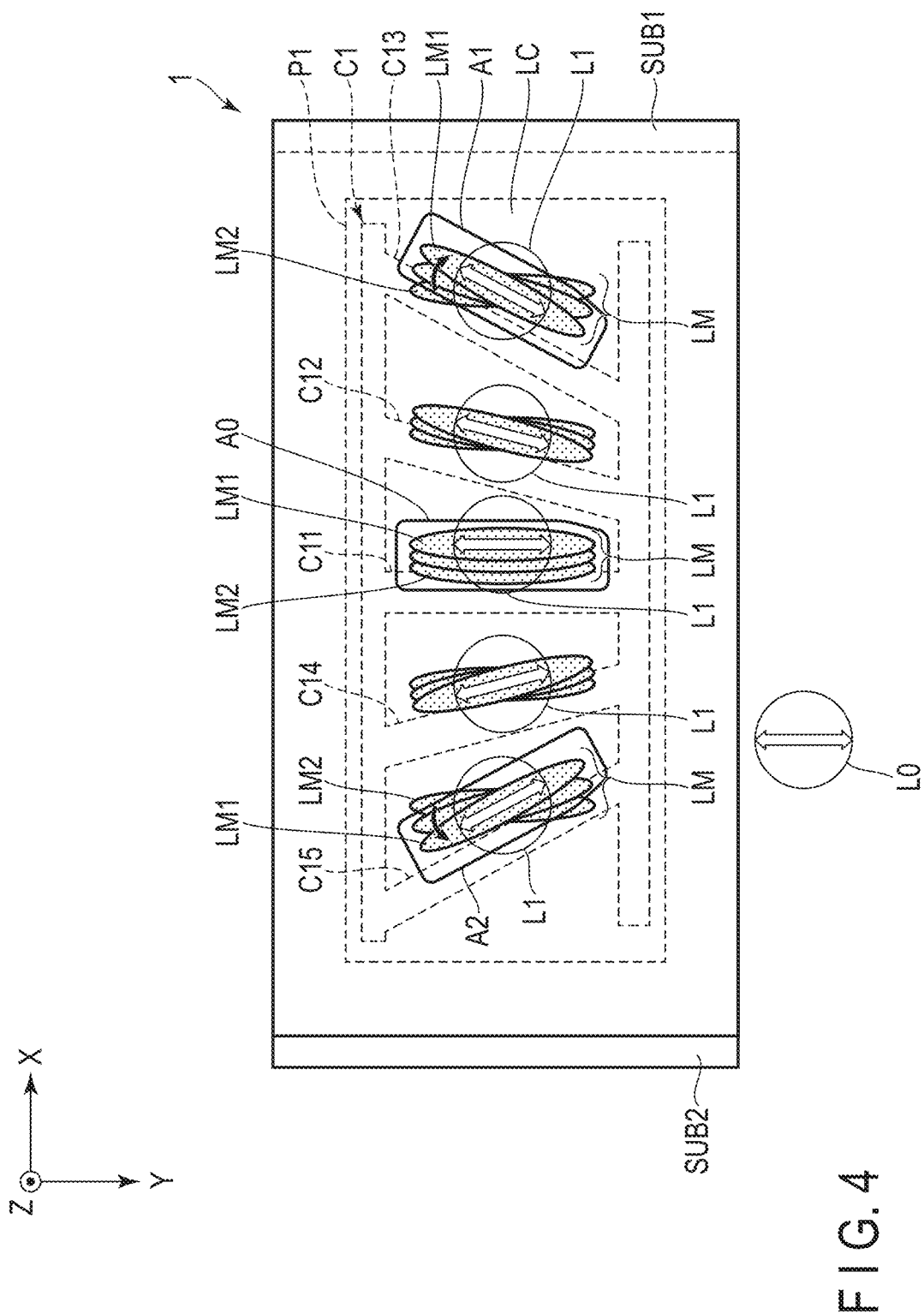
FIG. 4 is a diagram for explaining the action of the polarization conversion element 1 in an on state.

FIG. 4 is a diagram for explaining the action of the polarization conversion element 1 in an on state. FIG. 4 shows only elements necessary for explanation, and does not show the second control electrode C2, the second plane electrode P2, etc.

In the liquid crystal layer LC, the liquid crystal molecules LM2 near the second substrate SUB2 are all aligned in the second direction Y, and the liquid crystal molecules LM1 near the first substrate SUB1 are aligned in the respective extension directions of the strip electrodes of the first control electrode C1. The liquid crystal molecules LM arranged in the third direction Z include the liquid crystal molecules LM1 and LM2.

The liquid crystal layer LC comprises an area A0 including an area overlapping the strip electrode C11, an area A1 including an area overlapping the strip electrode C13, and an area A2 including an area overlapping the strip electrode C15, in the area where the first plane electrode P1 and the first control electrode C1 overlap.

In the area A0, the liquid crystal molecules LM arranged in the third direction Z are aligned uniformly to make their respective major axes extend in the second direction Y.

In the area (first area) A1, the liquid crystal molecules LM arranged in the third direction Z are aligned twistedly to make their respective major axes arranged clockwise from the second substrate SUB2 toward the first substrate SUB1.

In the area (second area) A2, the liquid crystal molecules LM arranged in the third direction Z are aligned twistedly to make their respective major axes arranged counterclockwise from the second substrate SUB2 toward the first substrate SUB1.

In the example shown in FIG. 4, light incident on the polarization conversion element 1 is linearly polarized light L0 having a polarization axis parallel to the second direction Y. Light emitted from the polarization conversion element 1 is linearly polarized light L1 having a polarization axis varying according to the transmissive region of the polarization conversion element 1. For example, the polarization axis of linearly polarized light L1 transmitted through the area A0 is substantially parallel to the second direction Y, and maintains the polarized state of linearly polarized light L0. The polarization axis of linearly polarized light L1 transmitted through the area A1 is parallel to a direction rotated clockwise with respect to the second direction Y. In addition, the polarization axis of linearly polarized light L1 transmitted through the area A2 is parallel to a direction rotated counterclockwise with respect to the second direction Y.

That is, in the example shown in the figure, the polarization axis of linearly polarized light L1, which is emitted light, is substantially parallel to the major axes of the liquid crystal molecules LM1 in an on state or the extension directions of the strip electrodes. Accordingly, the above-described polarization conversion element 1 can emit linearly polarized light L1 having a polarization axis in a desired direction in the X-Y plane.

Figure 5:
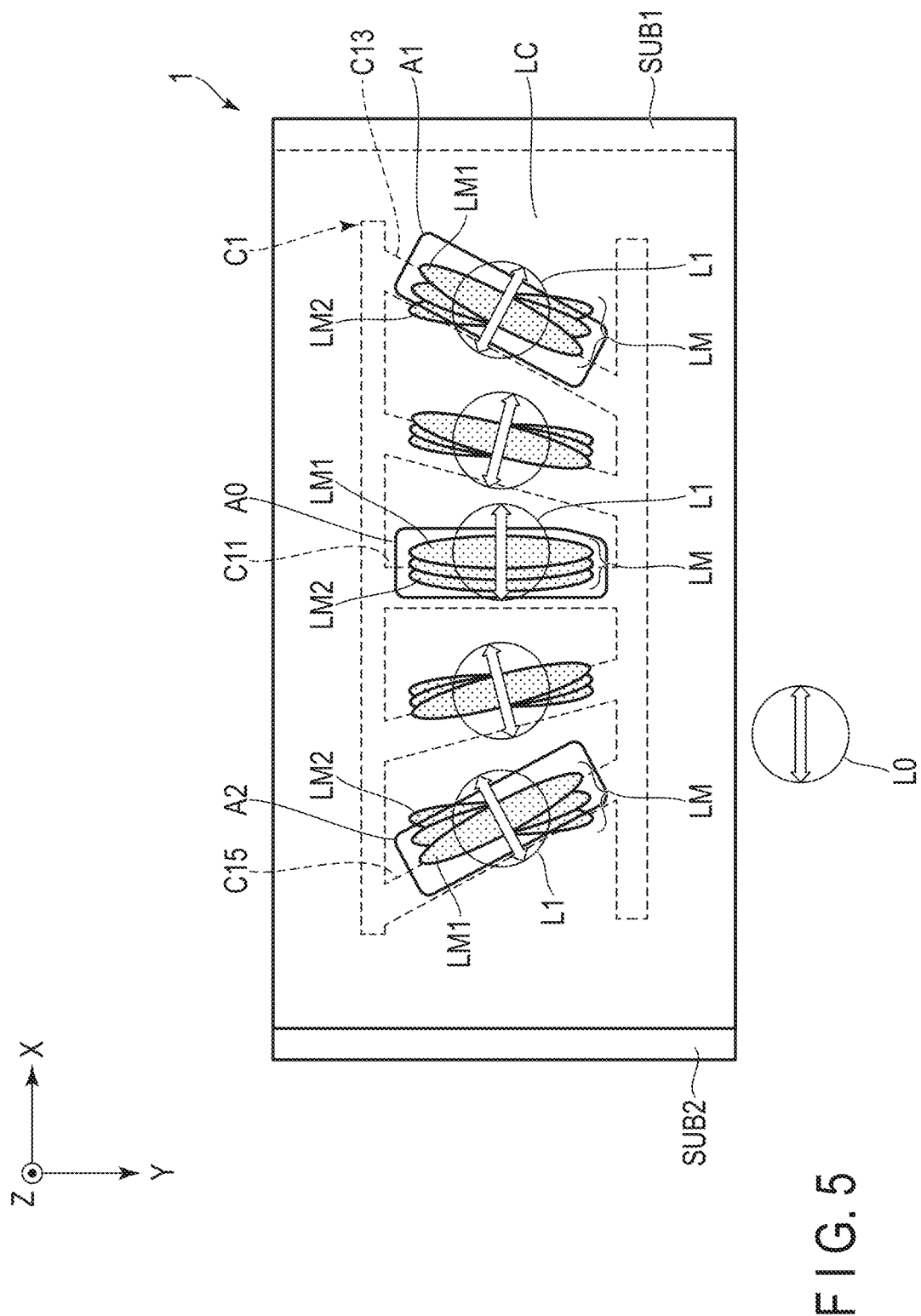
FIG. 5 is a diagram for explaining other action of the polarization conversion element 1 in an on state.

FIG. 5 is a diagram for explaining other action of the polarization conversion element 1 in an on state. The example shown in FIG. 5 differs from the example shown in FIG. 4 in the polarization axis of light incident on the polarization conversion element 1. That is, light incident on the polarization conversion element 1 is linearly polarized light L0 having a polarization axis parallel to the first direction X. The alignment state of the liquid crystal molecules LM in each area of the liquid crystal layer LC is the same as described with reference to FIG. 4.

Light emitted from the polarization conversion element 1 will be described. The polarization axis of linearly polarized light L1 transmitted through the area A0 is substantially parallel to the first direction X, and maintains the polarized state of linearly polarized light L0. The polarization axis of linearly polarized light L1 transmitted through the area A1 is parallel to a direction rotated clockwise with respect to the first direction X. In addition, the polarization axis of linearly polarized light L1 transmitted through the area A2 is parallel to a direction rotated counterclockwise with respect to the first direction X. That is, in the example shown in the figure, the polarization axis of linearly polarized light L1, which is emitted light, is substantially orthogonal to the major axes of the liquid crystal molecules LM1 in an on state or the extension directions of the strip electrodes.

As described with reference to FIG. 4 and FIG. 5, linearly polarized light L1 having a polarization axis in a desired direction can be emitted in the X-Y plane, both in a case where linearly polarized light L0 having a polarization axis parallel to the major axes of the liquid crystal molecules LM2 is incident on the polarization conversion element 1 and in a case where linearly polarized light L0 having a polarization axis parallel to the minor axes of the liquid crystal molecules LM2 is incident on the polarization conversion element 1.

Another configuration example will be described next with reference to FIG. 6 and FIG. 7.

Figure 6:
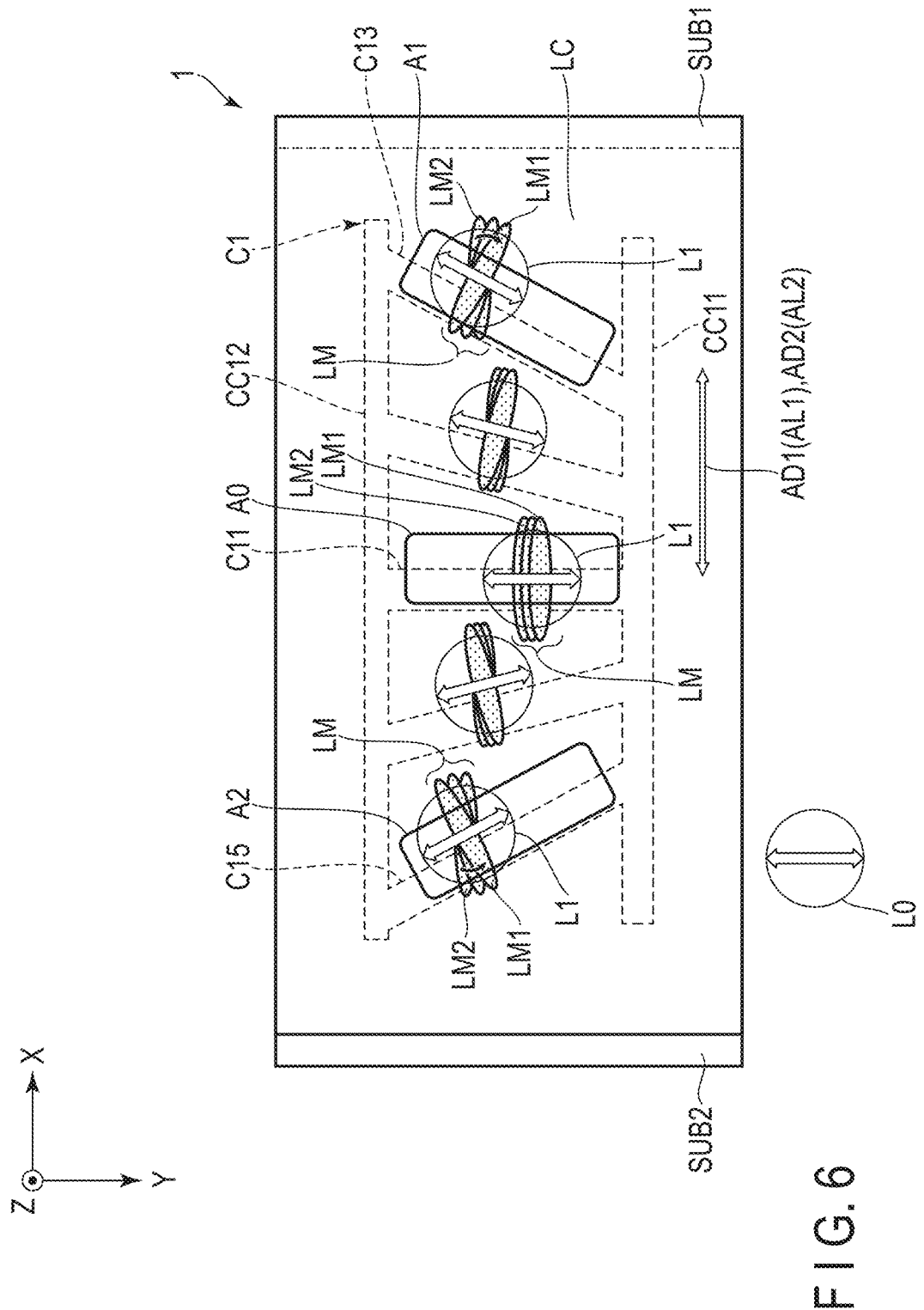
FIG. 6 is a diagram for explaining other action of the polarization conversion element 1 in an on state.

FIG. 6 is a diagram for explaining other action of the polarization conversion element 1 in an on state. In the configuration example shown in FIG. 6, the liquid crystal layer LC is composed of positive liquid crystal materials having positive dielectric anisotropy. The alignment treatment direction AD1 of the first alignment film AL1 and the alignment treatment direction AD2 of the second alignment film AL2 are parallel to each other, and are both substantially parallel to the first direction X. That is, the liquid crystal molecules LM in an off state are initially aligned in the first direction X. The extension directions of the common electrodes CC11 and CC12 are substantially parallel to the alignment treatment direction AD1 of the first alignment film AL1 or the initial alignment direction of the liquid crystal molecules LM1.

In the liquid crystal layer LC, the liquid crystal molecules LM2 near the second substrate SUB2 are all aligned in the first direction X, and the liquid crystal molecules LM1 near the first substrate SUB1 are aligned to be substantially orthogonal to the respective extension directions of the strip electrodes of the first control electrode C1.

In the area A0, the liquid crystal molecules LM arranged in the third direction Z are aligned uniformly to make their respective major axes extend in the first direction X.

In the area A1, the liquid crystal molecules LM arranged in the third direction Z are aligned twistedly to make their respective major axes arranged clockwise from the second substrate SUB2 toward the first substrate SUB1.

In the area A2, the liquid crystal molecules LM arranged in the third direction Z are aligned twistedly to make their respective major axes arranged counterclockwise from the second substrate SUB2 toward the first substrate SUB1.

In the example shown in FIG. 6, light incident on the polarization conversion element 1 is linearly polarized light L0 having a polarization axis parallel to the second direction Y. The polarization axis of linearly polarized light L1 transmitted through the area A0 is substantially parallel to the second direction Y, and maintains the polarized state of linearly polarized light L0. The polarization axis of linearly polarized light L1 transmitted through the area A1 is parallel to a direction rotated clockwise with respect to the second direction Y. In addition, the polarization axis of linearly polarized light L1 transmitted through the area A2 is parallel to a direction rotated counterclockwise with respect to the second direction Y.

That is, in the example shown in the figure, the polarization axis of linearly polarized light L1, which is emitted light, is substantially orthogonal to the major axes of the liquid crystal molecules LM1 in an on state, and is substantially parallel to the extension directions of the strip electrodes. Accordingly, the above-described polarization conversion element 1 can emit linearly polarized light L1 having a polarization axis in a desired direction as in the example shown in FIG. 4.

Figure 7:
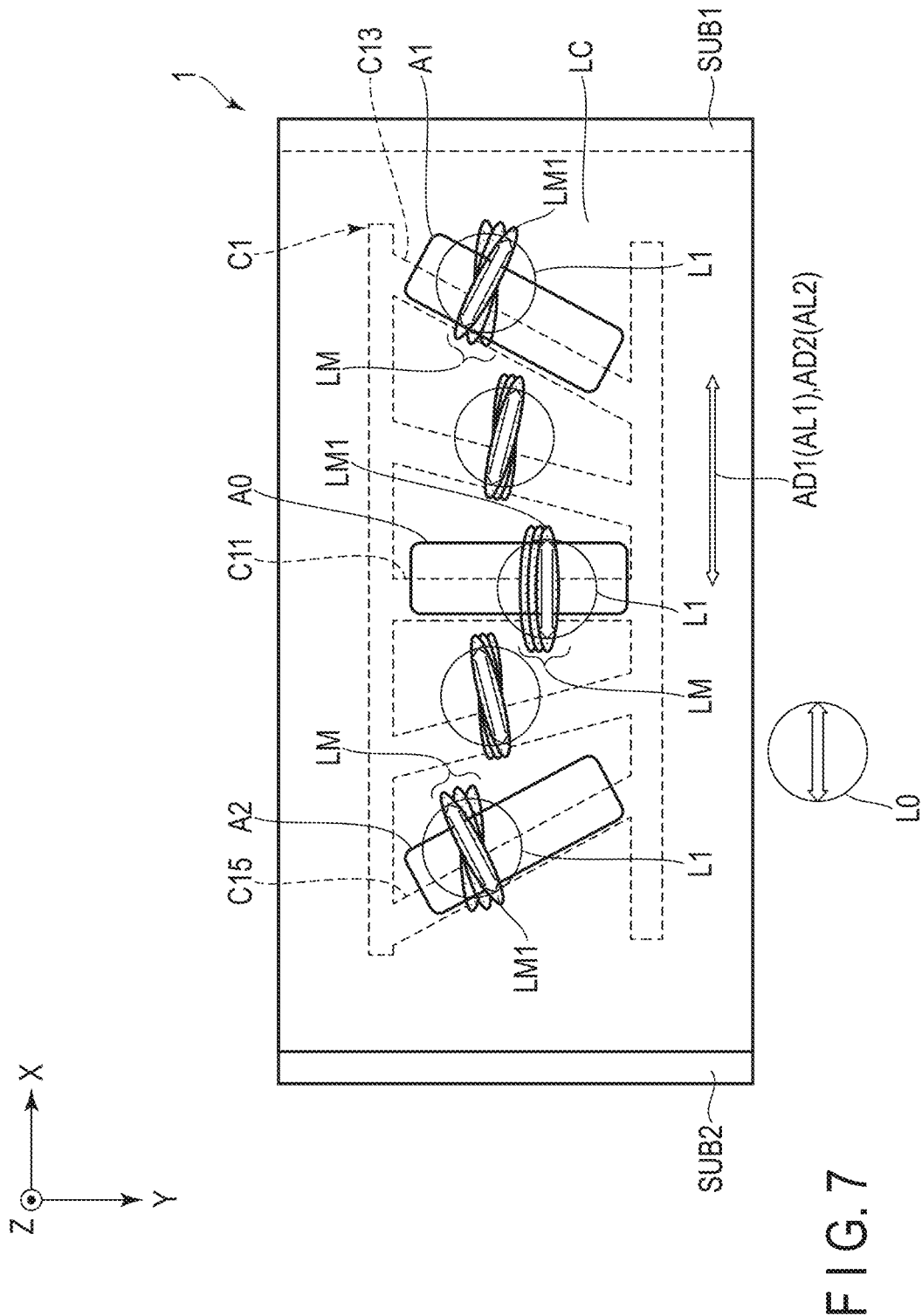
FIG. 7 is a diagram for explaining other action of the polarization conversion element 1 in an on state.

FIG. 7 is a diagram for explaining other action of the polarization conversion element 1 in an on state. The example shown in FIG. 7 differs from the example shown in FIG. 6 in the polarization axis of light incident on the polarization conversion element 1. That is, light incident on the polarization conversion element 1 is linearly polarized light L0 having a polarization axis parallel to the first direction X. The alignment state of the liquid crystal molecules LM in each area of the liquid crystal layer LC is the same as described with reference to FIG. 6.

Light emitted from the polarization conversion element 1 will be described. The polarization axis of linearly polarized light L1 transmitted through the area A0 is substantially parallel to the first direction X, and maintains the polarized state of linearly polarized light L0. The polarization axis of linearly polarized light L1 transmitted through the area A1 is parallel to a direction rotated clockwise with respect to the first direction X. In addition, the polarization axis of linearly polarized light L1 transmitted through the area A2 is parallel to a direction rotated counterclockwise with respect to the first direction X. That is, in the example shown in the figure, the polarization axis of linearly polarized light L1, which is emitted light, is substantially parallel to the major axes of the liquid crystal molecules LM1 in an on state, and is orthogonal to the extension directions of the strip electrodes.

As described with reference to FIG. 6 and FIG. 7, linearly polarized light L1 having a polarization axis in a desired direction can be emitted in the X-Y plane even in a case where the liquid crystal layer LC is composed of positive liquid crystal materials.

Figure 8:
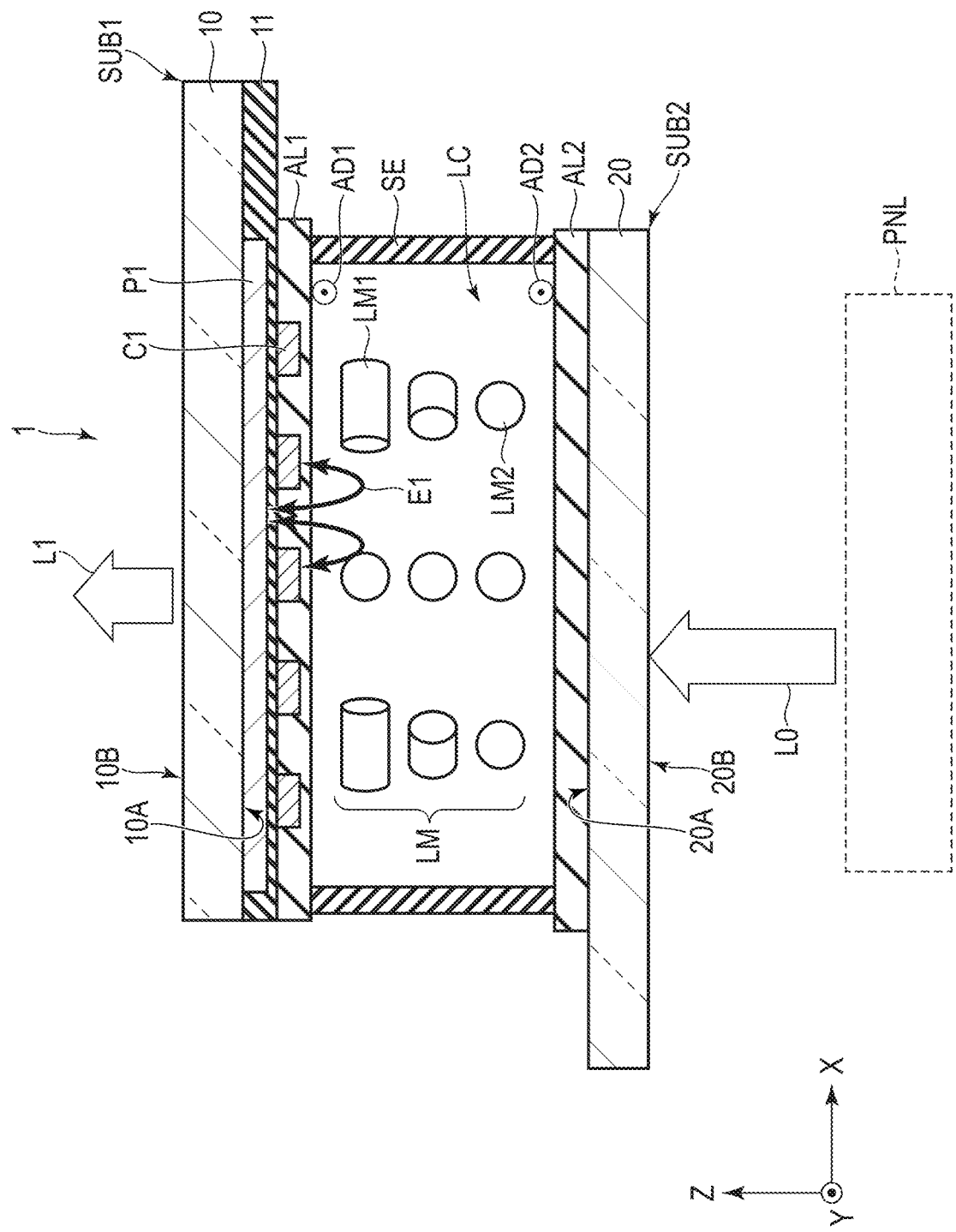
FIG. 8 is a cross-sectional view showing another configuration example of the polarization conversion element 1.

FIG. 8 is a cross-sectional view showing another configuration example of the polarization conversion element 1. The configuration example shown in FIG. 8 differs from the configuration example shown in FIG. 1 in that the second substrate SUB2 does not comprise a second control electrode and a second plane electrode. The second alignment film AL2 is disposed on the second inner surface 20A of the second insulating substrate 20, and is subjected to alignment treatment. The alignment treatment direction AD2 of the second alignment film AL2 is parallel to the alignment treatment direction AD1 of the first alignment film AL1, and is parallel to the second direction Y.

As described in the above configuration example, it is preferable that the liquid crystal molecules LM2 near the second substrate SUB2 having a plane of incidence (second outer surface 20B), of the liquid crystal molecules LM of the liquid crystal layer LC, be maintained in the initial alignment state even in an on state. According to the configuration example shown in FIG. 8, since the second alignment film AL2 is subjected to alignment treatment, the alignment state of the liquid crystal molecules LM2 can be maintained in the initial alignment state without forming the electric field E2 shown in FIG. 1.

Accordingly, the same advantages as those of the above-described configuration example can be obtained. In addition, the configuration of the second substrate SUB2 is simplified, and a circuit board for supplying a voltage to the second substrate SUB2 is unnecessary, which enables cost reduction.

Note that if the second substrate SUB2 does not comprise a conductive layer, a transparent conductive film may be provided over substantially all the second outer surface 20B in order to prevent electrification, etc.

Second Embodiment

A second embodiment described below differs from the above-described first embodiment in the shapes of the first control electrode C1 and the second control electrode C2. The basic configuration of the polarization conversion element 1 in the second embodiment is identical to the basic configuration of the polarization conversion element 1 in the first embodiment shown in FIG. 1, and its explanation is omitted from the figures and description. In addition, in the second embodiment, too, the second control electrode C2, etc., may be omitted as in the configuration example described with reference to FIG. 8.

Figure 9:
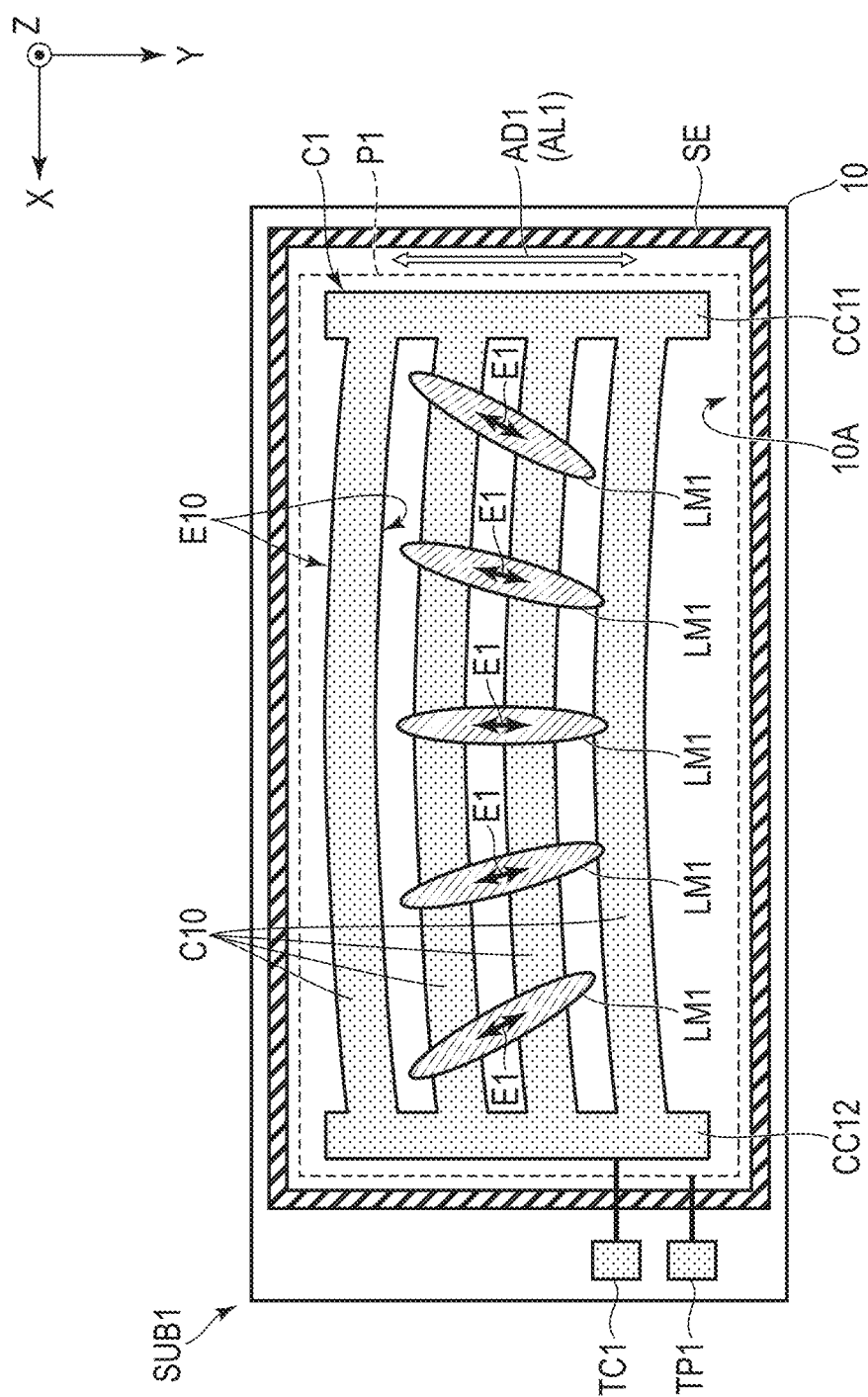
FIG. 9 is a plan view showing a configuration example of the first substrate SUB1.

FIG. 9 is a plan view showing a configuration example of the first substrate SUB1. FIG. 9 shows main parts on the first inner surface 10A side of the first insulating substrate 10 and the liquid crystal molecules LM1 near the first substrate SUB1. The first control electrode C1 is disposed in an inner area surrounded by the sealant SE, and overlaps the first plane electrode P1 indicated by a broken line.

The first control electrode C1 comprises strip electrodes C10 and the strip common electrodes CC11 and CC12. The common electrodes CC11 and CC12 each extend in the second direction Y and are arranged in the first direction X with a distance between them. The strip electrodes C10 are located between the common electrode CC11 and the common electrode CC12, and are arranged in the second direction Y with distances between them.

Each of the strip electrodes C10 is formed in an arcuate shape. The strip electrodes C10 comprise curved edges E10. The extension directions of the strip electrodes C10 are approximately the first direction X, and cross the common electrodes CC11 and CC12. The extension directions of the strip electrodes C10 cross the alignment treatment direction AD1 of the first alignment film AL1 or the initial alignment direction of the liquid crystal molecules LM1.

One end side of each of the strip electrodes C10 is connected to the common electrode CC11 with distances between them. The other end side of each of the strip electrodes C10 is connected to the common electrode CC12 with distances between them.

The first control electrode C1 and the first plane electrode P1 are connected to the terminals TC1 and TP1 by lines drawn out of the sealant SE, respectively.

A case where the liquid crystal layer is composed of positive liquid crystal materials will be described here.

The alignment treatment direction AD1 of the first alignment film AL1 or the initial alignment direction of the liquid crystal molecules LM1 is set to the second direction Y. In an on state, the electric field E1 which is substantially orthogonal to each of the extension directions of the strip electrodes C10 (or the edges E10 of the strip electrodes) is formed. The liquid crystal molecules LM1 are aligned to make their major axes extend along the electric field E1. That is, in the on state, the liquid crystal molecules LM1 are aligned to make their major axes substantially orthogonal to the respective extension directions of the strip electrodes C10 in planar view.

Since the first control electrode C1 comprises the strip electrodes C10 curved in an arcuate shape as described above, the alignment directions of the liquid crystal molecules LM1 differ between the areas of the X-Y plane. In the example shown in FIG. 9, the major axis of the liquid crystal molecule LM1 located substantially at the center of the first control electrode C1 is substantially parallel to the second direction Y, and the major axes of the liquid crystal molecules LM1 located at the outer edge of the first control electrode C1 incline with respect to the second direction Y. In addition, the liquid crystal molecules LM1 overlapping the first control electrode C1 are aligned in a state of being bilaterally symmetrical with respect to the strip electrode C11.

FIG. 10 is a plan view showing a configuration example of the second substrate SUB2. FIG. 10 shows main parts on the second inner surface 20A side of the second insulating substrate 20 and the liquid crystal molecules LM2 located near the second substrate SUB2. The second control electrode C2 is disposed in an inner area surrounded by the sealant SE, and overlaps the second plane electrode P2 indicated by a broken line.

The second control electrode C2 comprises the strip electrodes C20 and the strip common electrodes CC21 and CC22. The common electrodes CC21 and CC22 each extend in the second direction Y and are arranged in the first direction X with a distance between them. The strip electrodes C20 are located between the common electrode CC21 and the common electrode CC22, and are arranged in the second direction Y with distances between them.

Each of the strip electrodes C20 extends straight in the first direction X, and is orthogonal to the common electrodes CC21 and CC22. The strip electrodes C20 comprise straight edges E20. The respective extension directions of the strip electrodes C20 are parallel to each other. The extension directions of the strip electrodes C20 are orthogonal to the alignment treatment direction AD2 of the second alignment film AL2 or the initial alignment direction of the liquid crystal molecules LM2.

One end side of each of the strip electrodes C20 is connected to the common electrode CC21 with distances between them. The other end side of each of the strip electrodes C20 is connected to the common electrode CC22 with distances between them.

The second control electrode C2 and the second plane electrode P2 are connected to the terminals TC2 and TP2 by lines drawn out of the sealant SE, respectively.

The alignment treatment direction AD2 of the second alignment film AL2 or the initial alignment direction of the liquid crystal molecules LM2 is set to the second direction Y. In an on state, the electric field E2 which is substantially orthogonal to each of the extension directions of the strip electrodes C20 (or the edges E20 of the strip electrodes) is formed.

Since the second control electrode C2 comprises the straight strip electrodes C20 as described above, the alignment directions of the liquid crystal molecules LM2 are uniform in the areas of the X-Y plane. That is, the major axes of the liquid crystal molecules LM2 overlapping the second control electrode C2 are all substantially parallel to the second direction Y.

Figure 11:
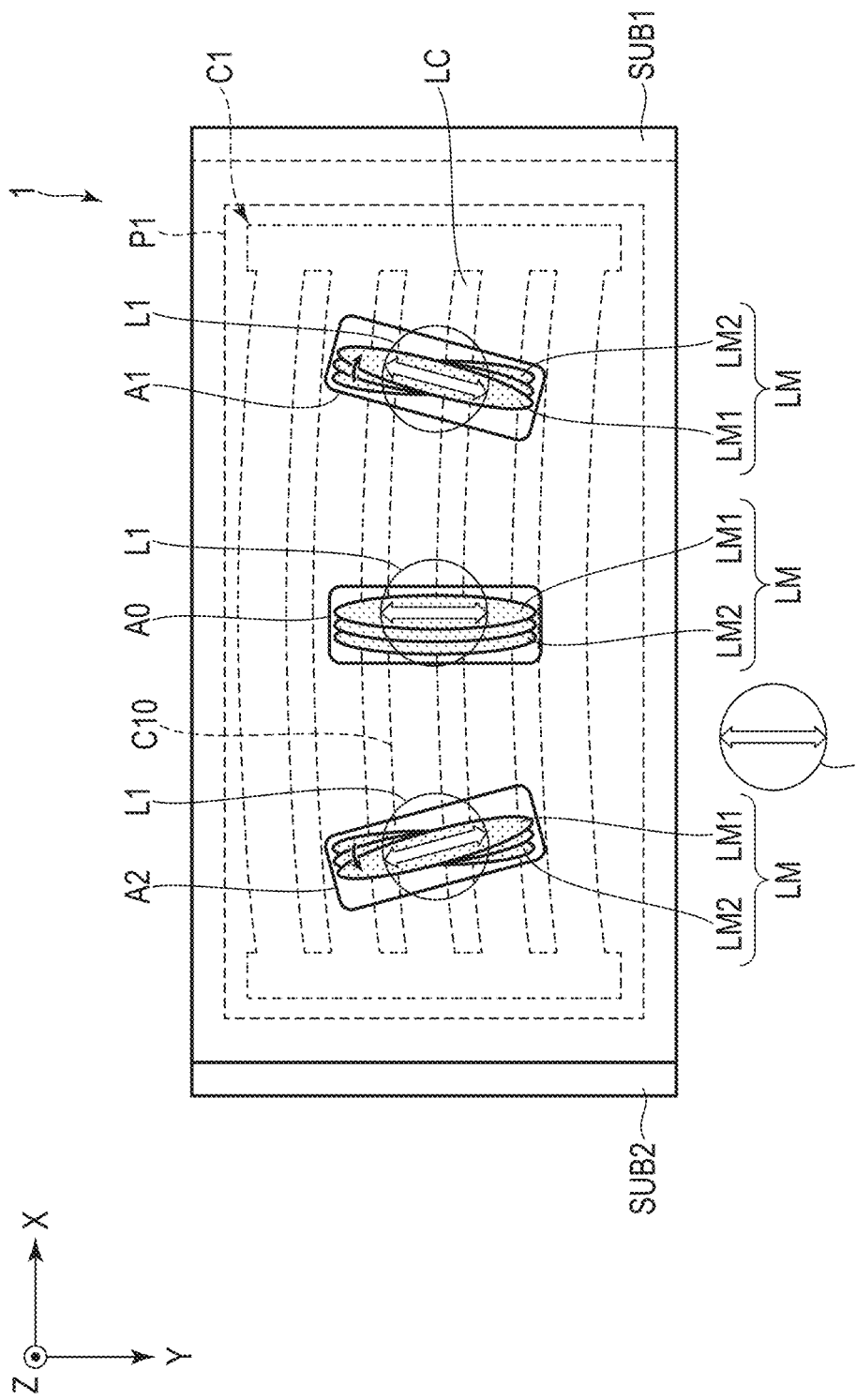
FIG. 11 is a diagram for explaining the action of the polarization conversion element 1 in an on state.

FIG. 11 is a diagram for explaining the action of the polarization conversion element 1 in an on state. FIG. 11 shows only elements necessary for explanation, and does not show the second control electrode C2, the second plane electrode P2, etc. Each of the strip electrodes C10 extends over the areas A0, A1, and A2 of the liquid crystal layer LC. In addition, the strip electrodes C20 of the second control electrode C2 shown in FIG. 10 also extend over the areas A0, A1, and A2 of the liquid crystal layer LC similarly.

In the liquid crystal layer LC, the liquid crystal molecules LM2 near the second substrate SUB2 are all aligned in the second direction Y, and the liquid crystal molecules LM1 near the first substrate SUB1 are aligned to be orthogonal to the extension directions of the strip electrodes C10 of the first control electrode C1. The liquid crystal molecules LM arranged in the third direction Z include the liquid crystal molecules LM1 and LM2. The alignment state of the above-described liquid crystal molecules LM is the same as that described with reference to FIG. 4.

That is, in the area A0, the liquid crystal molecules LM arranged in the third direction Z are aligned uniformly to make their respective major axes extend in the second direction Y. In the area (first area) A1, the liquid crystal molecules LM arranged in the third direction Z are aligned twistedly to make their respective major axes arranged clockwise from the second substrate SUB2 toward the first substrate SUB1. In the area (second area) A2, the liquid crystal molecules LM arranged in the third direction Z are aligned twistedly to make their respective major axes arranged counterclockwise from the second substrate SUB2 toward the first substrate SUB1.

In the example shown in FIG. 11, light incident on the polarization conversion element 1 is linearly polarized light L0 having a polarization axis parallel to the second direction Y. The polarization axis of linearly polarized light L1 transmitted through the area A0 is substantially parallel to the second direction Y, and maintains the polarized state of linearly polarized light L0. The polarization axis of linearly polarized light L1 transmitted through the area A1 is parallel to a direction rotated clockwise with respect to the second direction Y. In addition, the polarization axis of linearly polarized light L1 transmitted through the area A2 is parallel to a direction rotated counterclockwise with respect to the second direction Y. Accordingly, the above-described polarization conversion element 1 can emit linearly polarized light L1 having a polarization axis in a desired direction in the X-Y plane.

Figure 12:
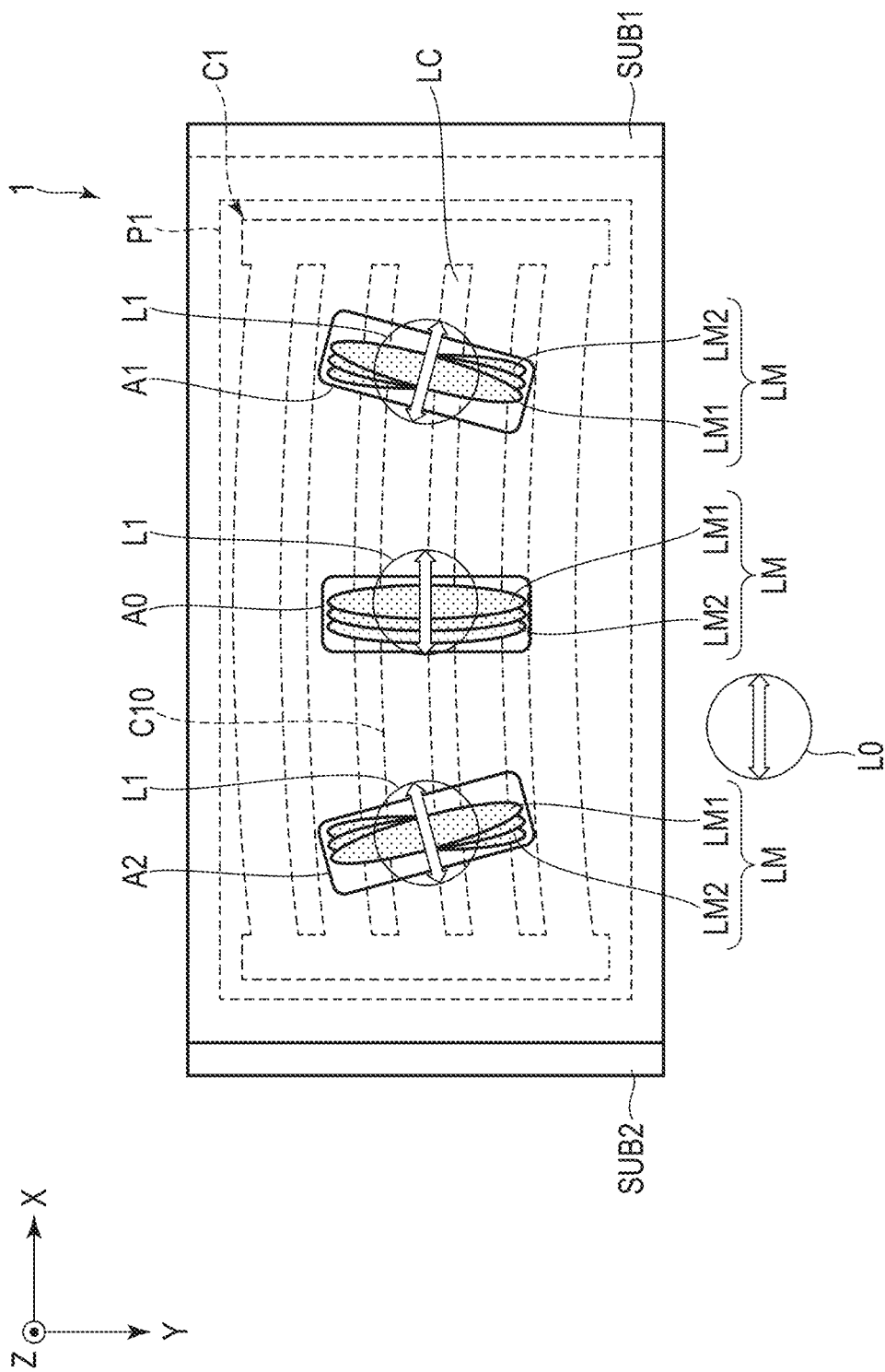
FIG. 12 is a diagram for explaining other action of the polarization conversion element 1 in an on state.

FIG. 12 is a diagram for explaining other action of the polarization conversion element 1 in an on state. The example shown in FIG. 12 differs from the example shown in FIG. 11 in the polarization axis of light incident on the polarization conversion element 1. That is, light incident on the polarization conversion element 1 is linearly polarized light L0 having a polarization axis parallel to the first direction X. The alignment state of the liquid crystal molecules LM in each of the areas A0 to A2 of the liquid crystal layer LC is the same as described with reference to FIG. 11. Light emitted from the polarization conversion element 1 is the same as described with reference to FIG. 5.

As described with reference to FIG. 11 and FIG. 12, linearly polarized light L1 having a polarization axis in a desired direction can be emitted in the X-Y plane, both in a case where linearly polarized light L0 having a polarization axis parallel to the major axes of the liquid crystal molecules LM2 is incident on the polarization conversion element 1, and in a case where linearly polarized light L0 having a polarization axis parallel to the minor axes of the liquid crystal molecules LM2 is incident on the polarization conversion element 1.

Another configuration example will be described next with reference to FIG. 13 and FIG. 14.

Figure 13:
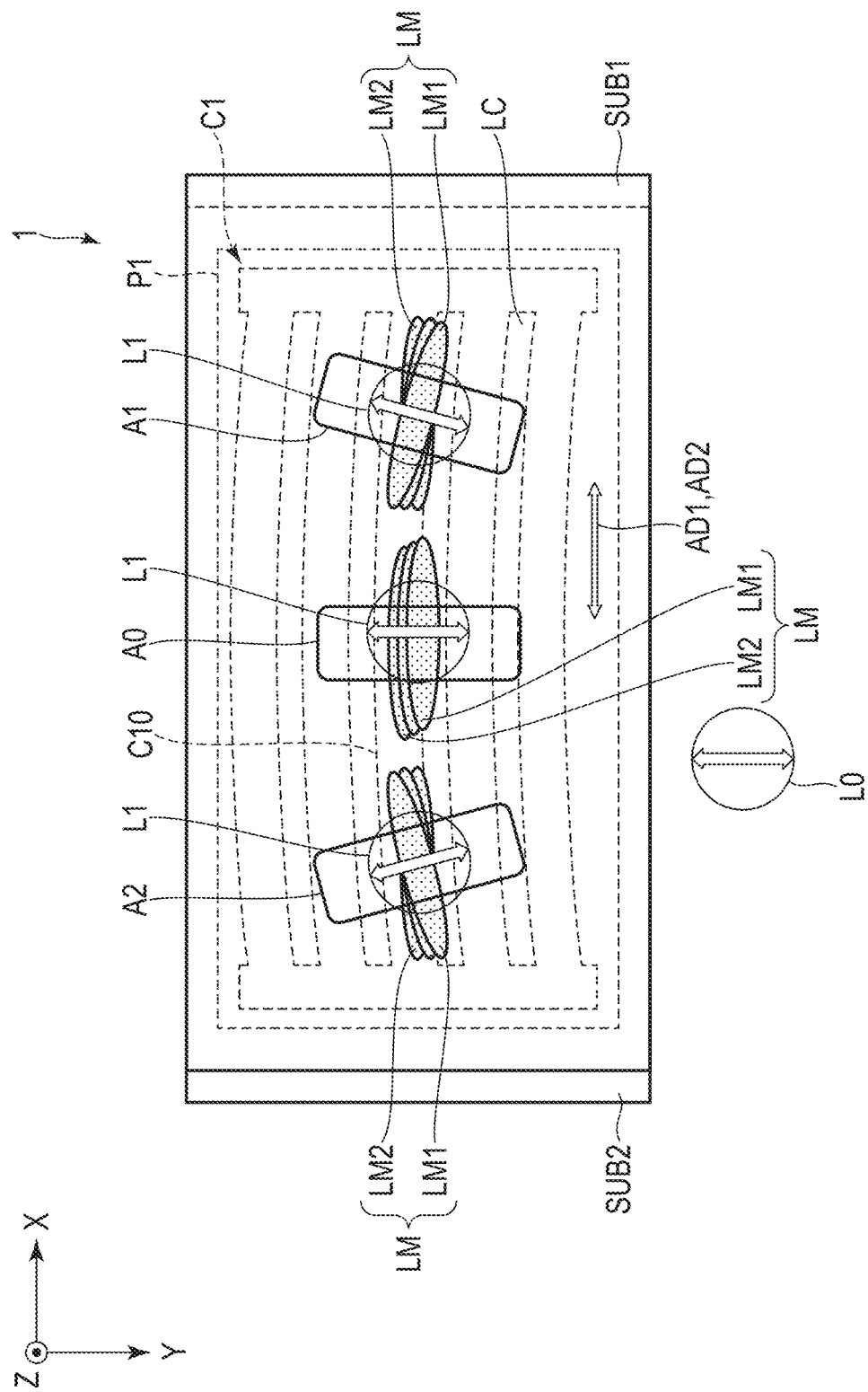
FIG. 13 is a diagram for explaining other action of the polarization conversion element 1 in an on state.

FIG. 13 is a diagram for explaining other action of the polarization conversion element 1 in an on state. In the configuration example shown in FIG. 13, the liquid crystal layer LC is composed of negative liquid crystal materials. The alignment treatment direction AD1 of the first alignment film AL1 and the alignment treatment direction AD2 of the second alignment film AL2 are parallel to each other, and are both substantially parallel to the first direction X. That is, the liquid crystal molecules LM in an off state are initially aligned in the first direction X. The alignment state of the liquid crystal molecules LM in each of the areas A0 to A2 of the liquid crystal layer LC is the same as described with reference to FIG. 6. Light emitted from the polarization conversion element 1 is the same as described with reference to FIG. 6.

Figure 14:
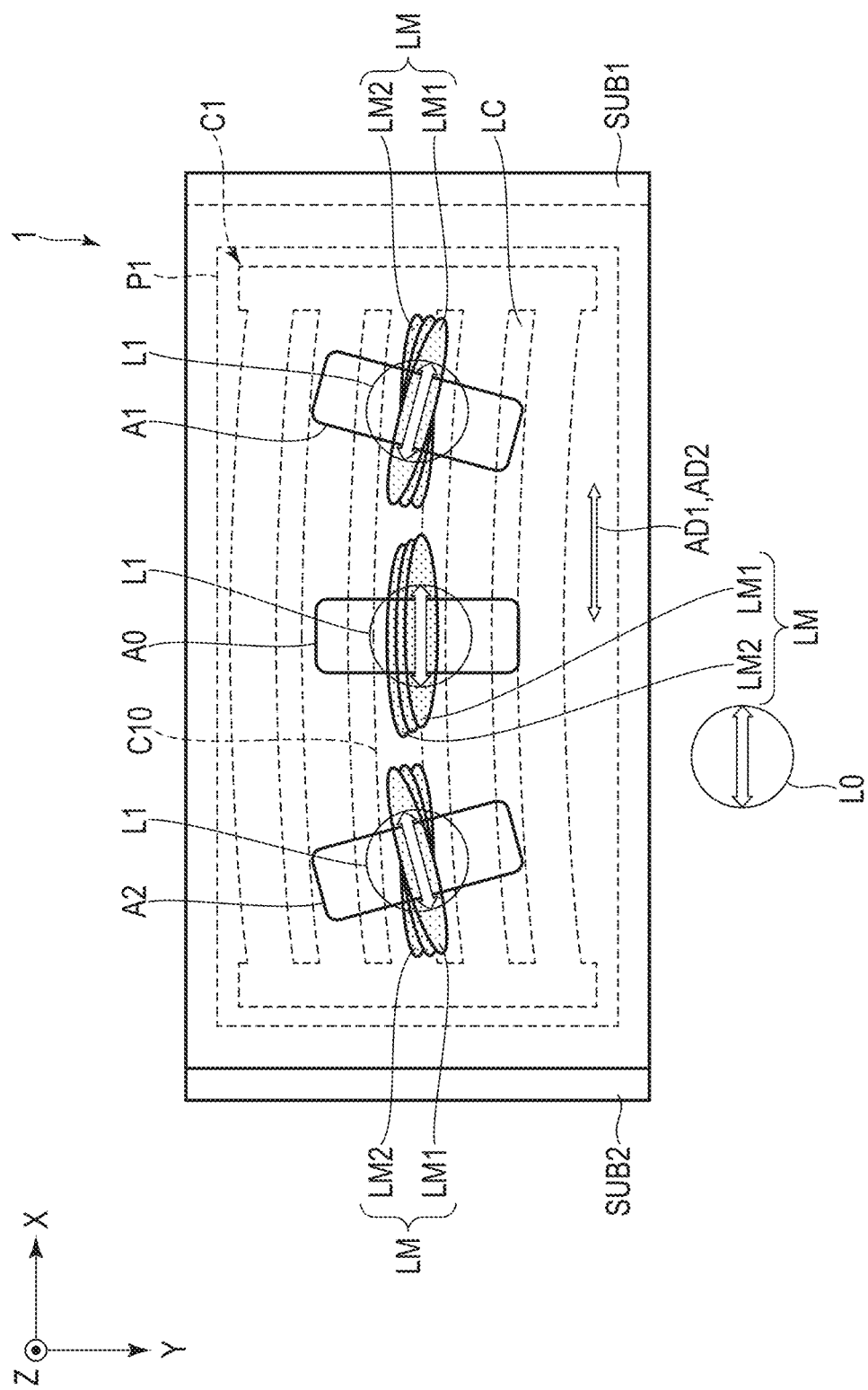
FIG. 14 is a diagram for explaining other action of the polarization conversion element 1 in an on state.

FIG. 14 is a diagram for explaining other action of the polarization conversion element 1 in an on state. The example shown in FIG. 14 differs from the example shown in FIG. 13 in the polarization axis of light incident on the polarization conversion element 1. That is, light incident on the polarization conversion element 1 is linearly polarized light L0 having a polarization axis parallel to the first direction X. The alignment state of the liquid crystal molecules LM in each of the areas A0 to A2 of the liquid crystal layer LC is the same as described with reference to FIG. 6. Light emitted from the polarization conversion element 1 is the same as described with reference to FIG. 7.

As described with reference to FIG. 13 and FIG. 14, linearly polarized light L1 having a polarization axis in a desired direction can be emitted in the X-Y plane even in a case where the liquid crystal layer LC is composed of negative liquid crystal materials.

Configuration Examples of Electrodes

Several configuration examples of strip electrodes applicable to the first control electrode C1 of the first embodiment will be described here.

Figure 15:
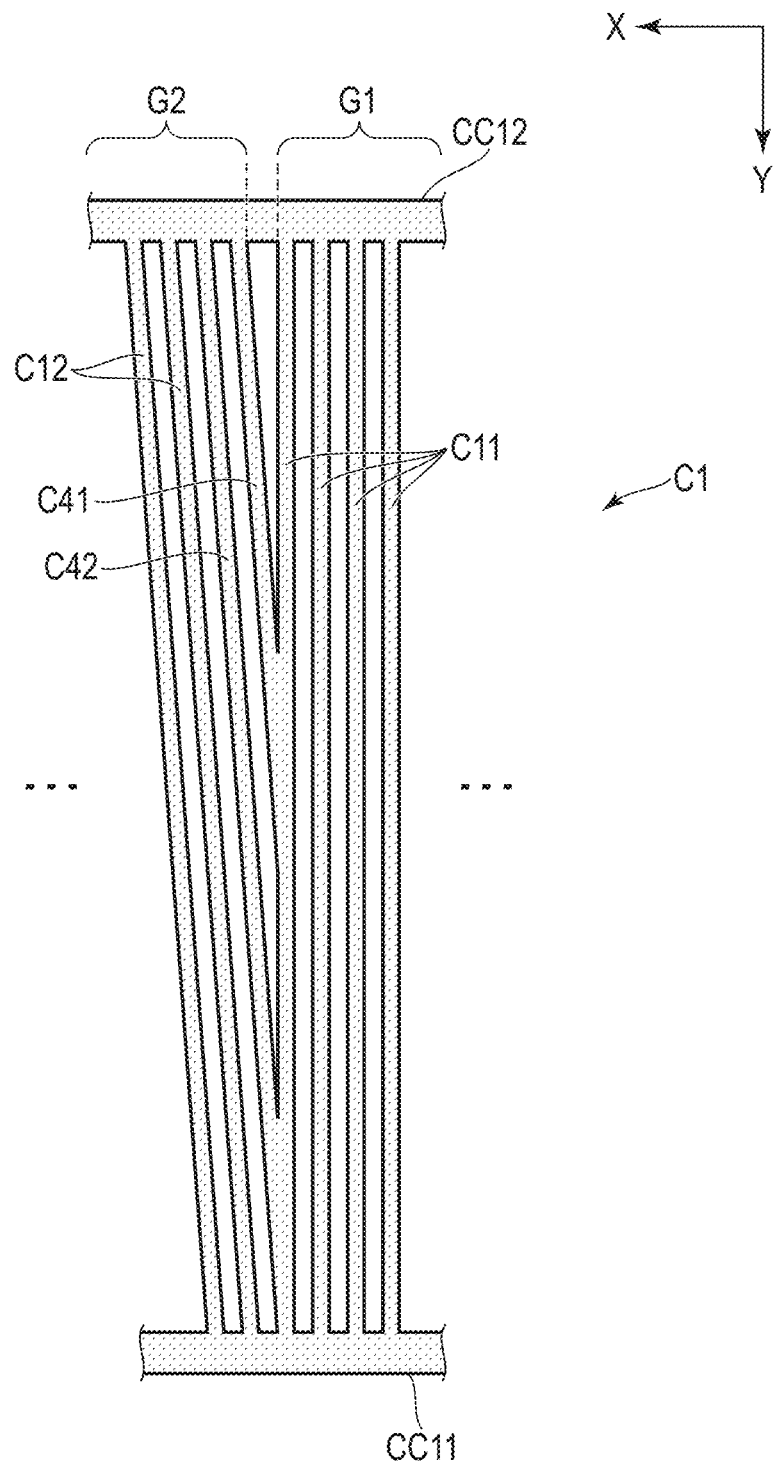
FIG. 15 is a diagram showing a first configuration example of a first control electrode C1.

FIG. 15 is a diagram showing a first configuration example of the first control electrode C1.

The first control electrode C1 comprises an electrode group G1 including strip electrodes C11 and an electrode group G2 including strip electrodes C12 and strip electrodes C41 and C42. The strip electrodes C11 shown in FIG. 15 correspond to the strip electrode C11 shown in FIG. 2, and the strip electrodes C12 shown in FIG. 15 correspond to the strip electrode C12 shown in FIG. 2.

The electrode groups here comprise strip electrodes extending in directions parallel to each other. In one electrode group, the lengths of strip electrodes may be different from each other, but the widths of the strip electrodes and the distances between the adjacent strip electrodes are constant. The lengths of the strip electrodes correspond to lengths in the extension directions, and the widths of and the distances between the strip electrodes correspond to lengths in a direction orthogonal to the extension directions.

In the electrode group G2, the strip electrodes C12 and the strip electrodes C41 and C42 are parallel to each other. The strip electrodes C12 are connected to the common electrodes CC11 and CC12. The strip electrode C41 is disposed, in the electrode group G2, at a position adjacent to the electrode group G1. One end side of each of the strip electrodes C41 and C42 is connected to the strip electrode C11 adjacent to the electrode group G2, and the other end side thereof is connected to the common electrode CC12.

In the above-described first configuration example, the strip electrodes C11 correspond to first strip electrodes, the strip electrodes C12 correspond to second strip electrodes, the strip electrode C41 corresponds to a fourth strip electrode, the electrode group G1 corresponds to a first electrode group, and the electrode group G2 corresponds to a second electrode group.

According to the above-described first configuration example, in each of the electrode groups G1 and G2 adjacent to each other in the first direction X, a desired liquid crystal alignment state can be formed in an on state, and a desired liquid crystal alignment state can be formed also near the border between the electrode groups G1 and G2.

Figure 16:
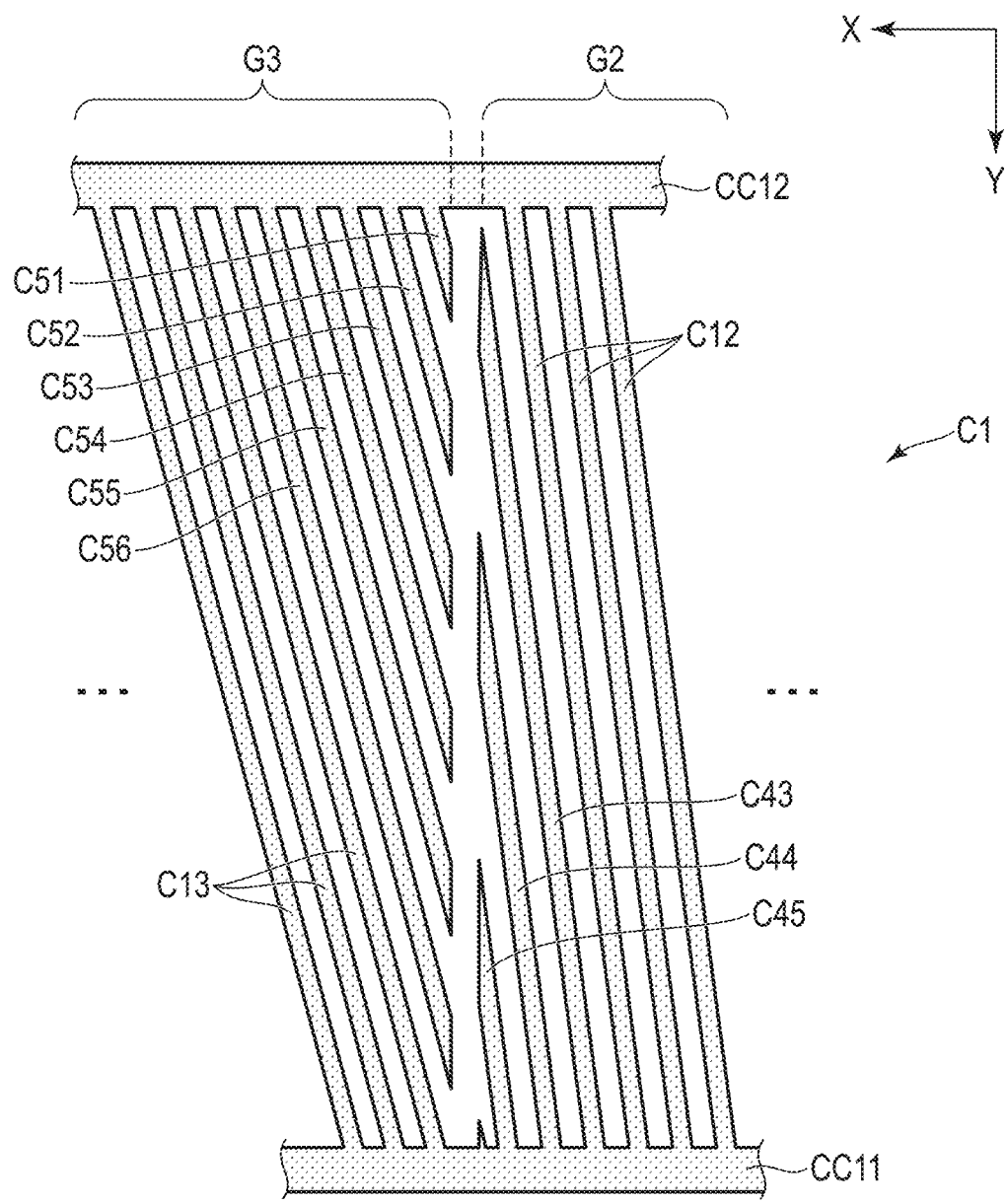
FIG. 16 is a diagram showing a second configuration example of the first control electrode C1.

FIG. 16 is a diagram showing a second configuration example of the first control electrode C1.

The first control electrode C1 comprises the electrode group G2 and an electrode group G3. The electrode group G2 includes strip electrodes C43 to C45 in addition to the strip electrodes C12. The electrode group G3 includes strip electrodes C51 to C56 in addition to strip electrodes C13. The strip electrodes C13 shown in FIG. 16 correspond to the strip electrode C13 shown in FIG. 2.

In the electrode group G2, the strip electrodes C12 and the strip electrodes C43 to C45 are parallel to each other. One end side of each of the strip electrodes C43 to C45 is connected to the common electrode CC11, and the other end side thereof is separated from all the strip electrodes of the electrode group G3 and is not connected to the common electrode CC12.

In the electrode group G3, the strip electrodes C13 and the strip electrodes C51 to C56 are parallel to each other. The other end side of each of the strip electrodes C51 to C56 is connected to the common electrode CC12 and one end side thereof is separated from all the strip electrodes of the electrode group G2 and is not connected to the common electrode CC11.

In the above-described second configuration example, the strip electrodes C12 correspond to second strip electrodes, the strip electrodes C13 correspond to third strip electrodes, the strip electrode C51 corresponds to a fifth strip electrode, the electrode group G2 corresponds to a second electrode group, and the electrode group G3 corresponds to a third electrode group.

According to the above-described second configuration example, in each of the electrode groups G2 and G3 adjacent to each other in the first direction X, a desired liquid crystal alignment state can be formed in an on state, and a desired liquid crystal alignment state can be formed also near the border between the electrode groups G2 and G3.

Figure 17:
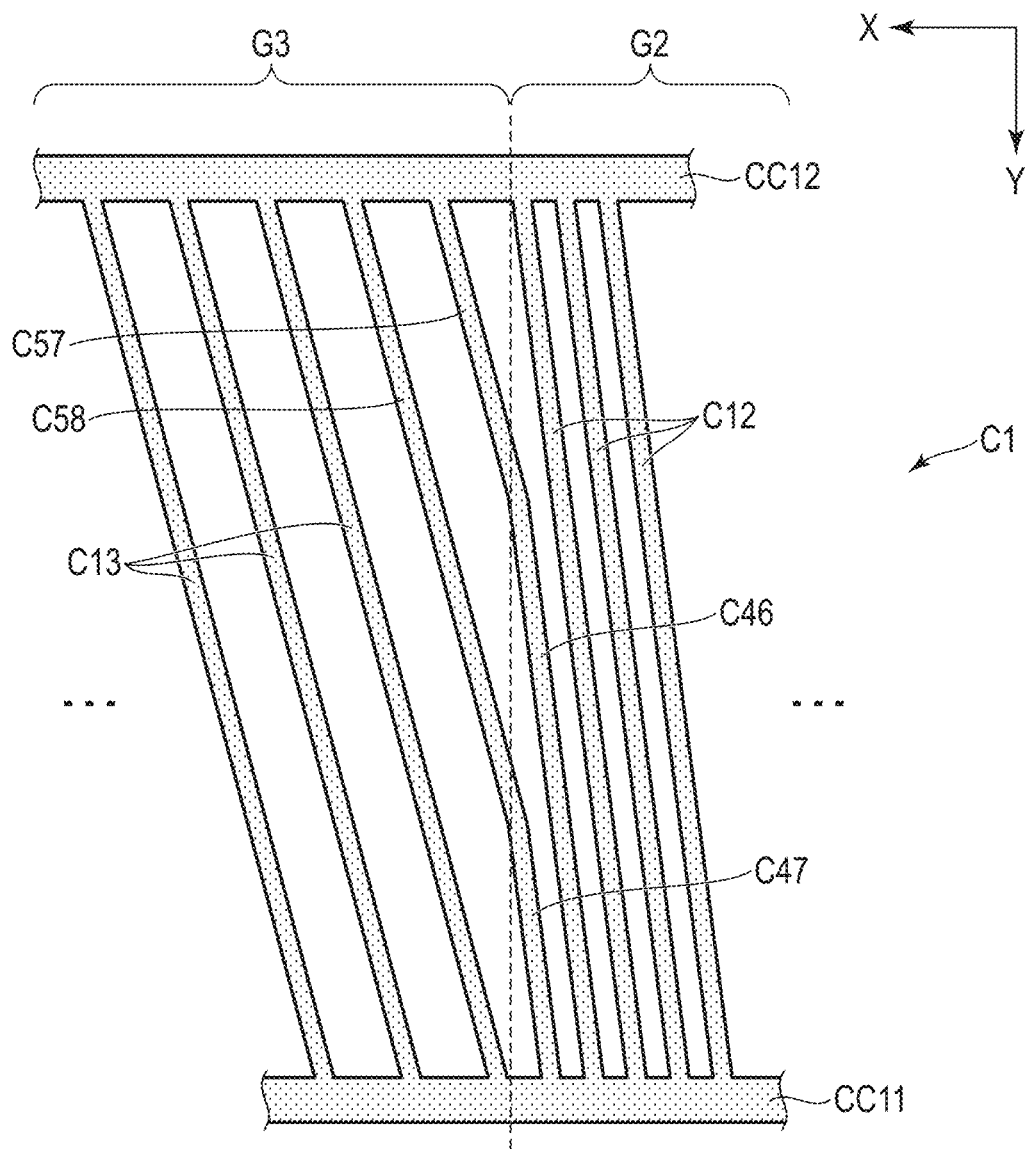
FIG. 17 is a diagram showing a third configuration example of the first control electrode C1.

FIG. 17 is a diagram showing a third configuration example of the first control electrode C1. The third configuration example shown in FIG. 17 differs from the second configuration example shown in FIG. 16 in that the strip electrodes of the electrode group G2 and the strip electrodes of the electrode group G3 are connected. The electrode group G2 includes strip electrodes C46 and C47 in addition to the strip electrodes C12. The electrode group G3 includes strip electrodes C57 and C58 in addition to the strip electrode C13.

In the electrode group G2, the strip electrodes C12 and the strip electrodes C46 and C47 are parallel to each other. One end side of each of the strip electrodes C46 and C47 is connected to the common electrode CC11. The other end side of each of the strip electrodes C46 and C47 is connected to one of the strip electrodes of the electrode group G3, and is not connected to the common electrode CC12.

In the electrode group G3, the strip electrodes C13 and the strip electrodes C57 and C58 are parallel to each other. The other end side of each of the strip electrodes C57 and C58 is connected to the common electrode CC12. One end side of each of the strip electrodes C57 and C58 is connected to one of the strip electrodes of the electrode group G2, and is not connected to the common electrode CC11.

In the example shown in FIG. 17, the other end side of the strip electrode C46 is connected to one end side of the strip electrode C57. That is, the strip electrodes C46 and C57 form one bent strip electrode. Similarly, the other end side of the strip electrode C47 is connected to one end side of the strip electrode C58. That is, the strip electrodes C47 and C58 form one bent strip electrode.

In the above-described third configuration example, the strip electrodes C12 correspond to second strip electrodes, the strip electrodes C13 correspond to third strip electrodes, the strip electrode C46 corresponds to a sixth strip electrode, the strip electrode C57 corresponds to a seventh strip electrode, the electrode group G2 corresponds to a second electrode group, and the electrode group G3 corresponds to a third electrode group.

In the above-described third configuration example, too, the same advantages as those of the second configuration example can be obtained.

Figure 18:
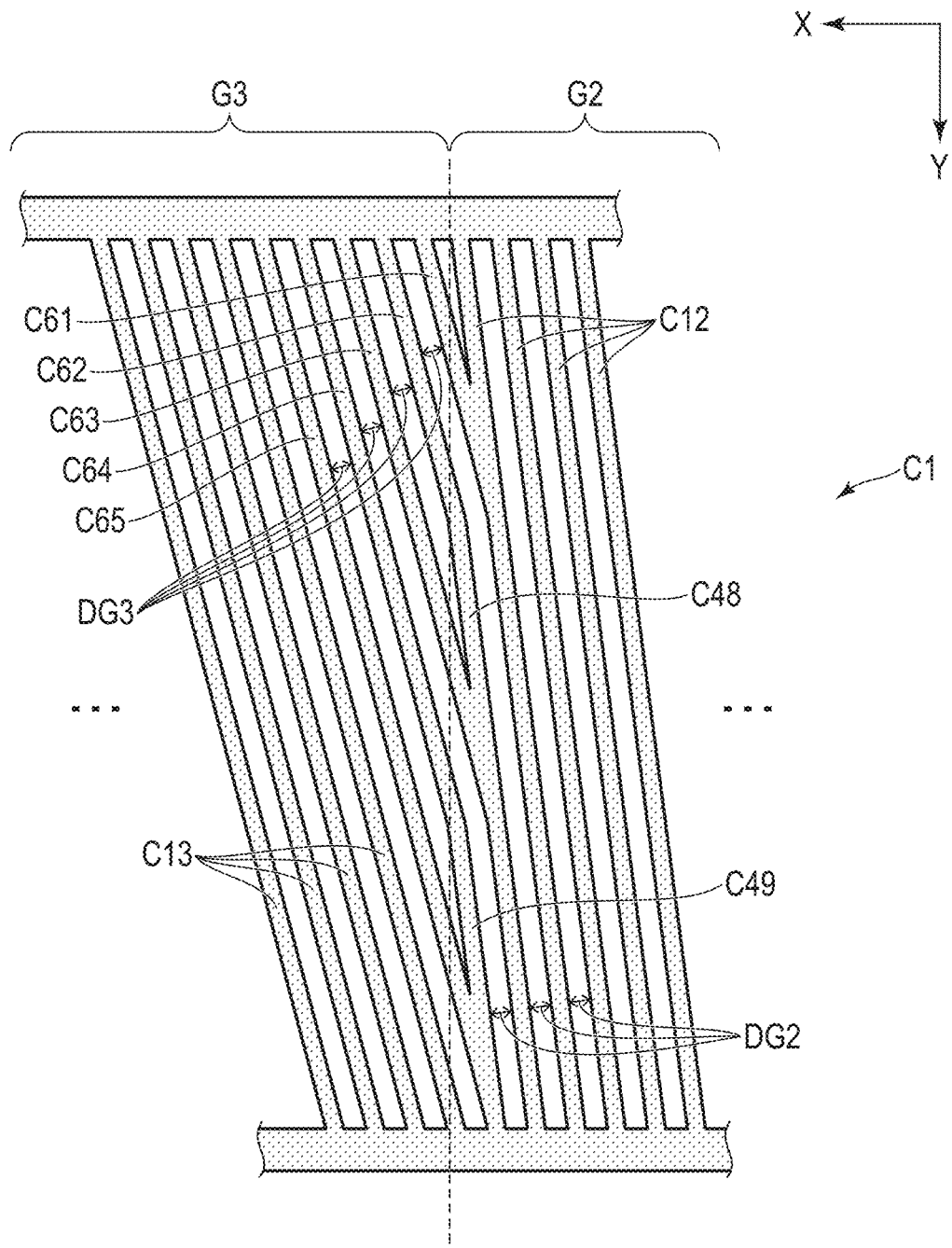
FIG. 18 is a diagram showing a fourth configuration example of the first control electrode C1.

FIG. 18 is a diagram showing a fourth configuration example of the first control electrode C1. The fourth configuration example shown in FIG. 18 differs from the third configuration example shown in FIG. 17 in that one strip electrode of the electrode group G2 and strip electrodes of the electrode group G3 are connected. The electrode group G2 includes strip electrodes C48 and C49 in addition to the strip electrodes C12. The electrode group G3 includes strip electrodes C61 to C65 in addition to the strip electrodes C13.

In the electrode group G2, the strip electrodes C12 and the strip electrodes C48 and C49 are parallel to each other. One end side of each of the strip electrodes C48 and C49 is connected to the common electrode CC11. The other end side of each of the strip electrodes C48 and C49 is connected to one of the strip electrodes of the electrode group G3, and is not connected to the common electrode CC12.

In the electrode group G3, the strip electrodes C13 and the strip electrodes C61 to C65 are parallel to each other. The strip electrodes C61 to C65 are arranged with constant distances DG3 between them. The distances DG3 are equal to distances DG2 between the strip electrodes of the electrode group G2. The other end side of each of the strip electrodes C61 to C65 is connected to the common electrode CC12. One end side of each of the strip electrodes C61 to C65 is connected to one of the strip electrodes of the electrode group G2, and is not connected to the common electrode CC11.

In the example shown in FIG. 18, one end side of the strip electrode C61 is connected to a middle portion of the strip electrode C12. The middle portion here corresponds to any portion between the one end side connected to the common electrode CC11 and the other end side on the opposite side. One end side of the strip electrode C62 is connected to the other end side of the strip electrode C48, and one end side of the strip electrode C63 is connected to a middle portion of the strip electrode C48. Similarly, one end side of the strip electrode C64 is connected to the other end side of the strip electrode C49, and one end side of the strip electrode C65 is connected to a middle portion of the strip electrode C49.

In the above-described fourth configuration example, the strip electrodes C12 correspond to second strip electrodes, the strip electrodes C13 correspond to third strip electrodes, the strip electrode C48 corresponds to an eighth strip electrode, the strip electrode C62 corresponds to a ninth strip electrode, the strip electrode C63 corresponds to a tenth strip electrode, the electrode group G2 corresponds to a second electrode group, and the electrode group G3 corresponds to a third electrode group.

In the above-described fourth configuration example, too, the same advantages as those of the third configuration example can be obtained.

<Liquid Crystal Characteristics>

In a liquid crystal cell for testing in which the liquid crystal layer LC was held between the first substrate SUB1 and the second substrate SUB2, the liquid crystal alignment state in a state where a voltage of 10V was applied to the liquid crystal layer LC was simulated. The description here explains, in particular, the alignment state of the liquid crystal molecules LM1 near the first substrate SUB1.

Figure 19:
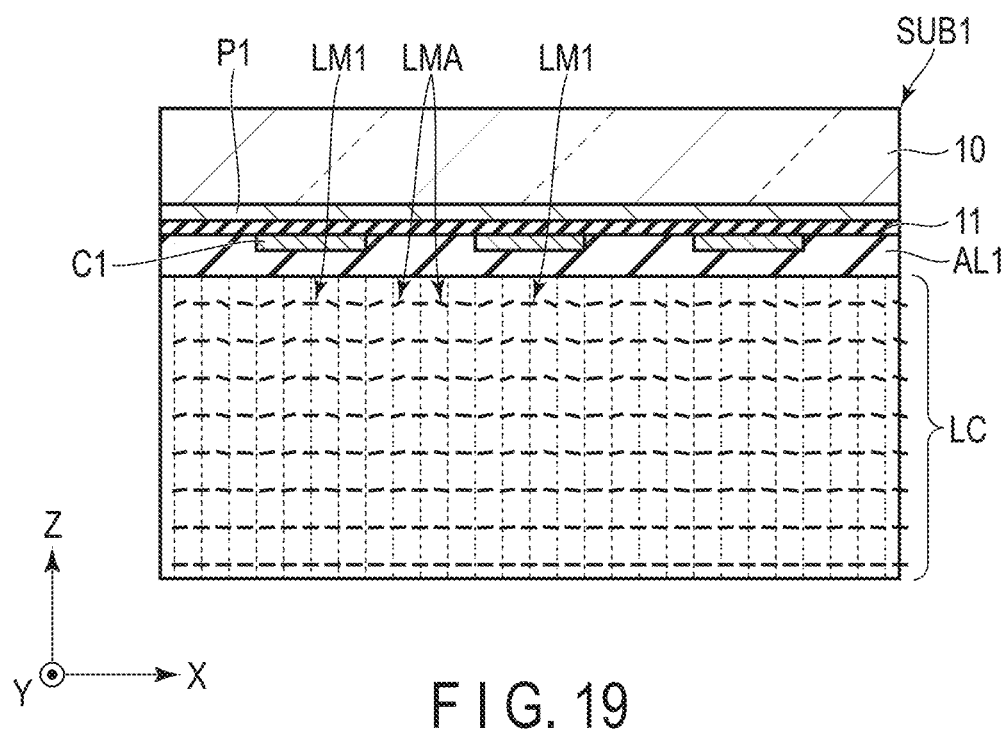
FIG. 19 is a diagram schematically showing the alignment state of positive liquid crystal materials.

FIG. 19 is a diagram schematically showing the alignment state of positive liquid crystal materials. In a case where the liquid crystal layer LC was composed of the positive liquid crystal materials, the liquid crystal molecules LM1 were aligned to make their major axes extend along an electric field. The electric field here corresponds to the electric field E1 shown in FIG. 1, and was formed between the first control electrode C1 and the first plane electrode P1. The liquid crystal molecules LM1 initially aligned along the X-Y plane were aligned in directions different from the initial alignment direction by the action of the electric field E1. Some liquid crystal molecules LMA tended to rise near the first substrate SUB1 by the action of the electric field.

Figure 20:
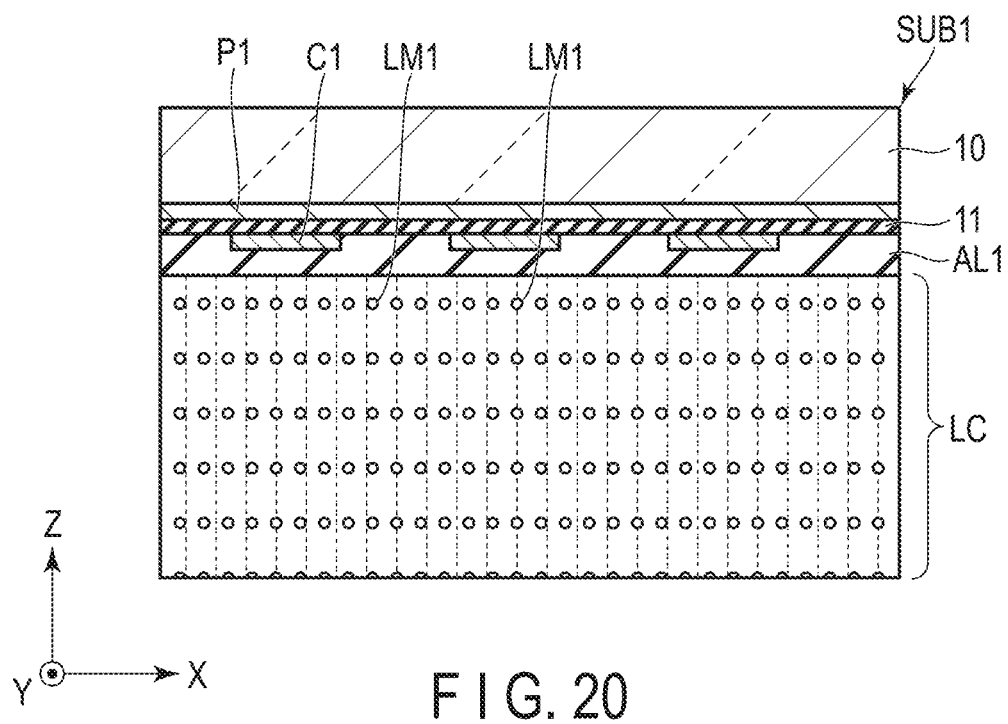
FIG. 20 is a diagram schematically showing the alignment state of negative liquid crystal materials.

FIG. 20 is a diagram schematically showing the alignment state of negative liquid crystal materials. In a case where the liquid crystal layer LC was composed of the negative liquid crystal materials, the liquid crystal molecules LM1 were aligned to make their major axes cross the electric field. The liquid crystal molecules LM1 initially aligned along the X-Y plane were aligned in directions different from the initial alignment direction along the X-Y plane when the electric field E1 acted. That is, in the case the negative liquid crystal materials were applied, the liquid crystal molecules LM1 almost did not rise and were aligned along the X-Y plane both in the initial alignment state and in the state where the electric field acted.

Figure 21:
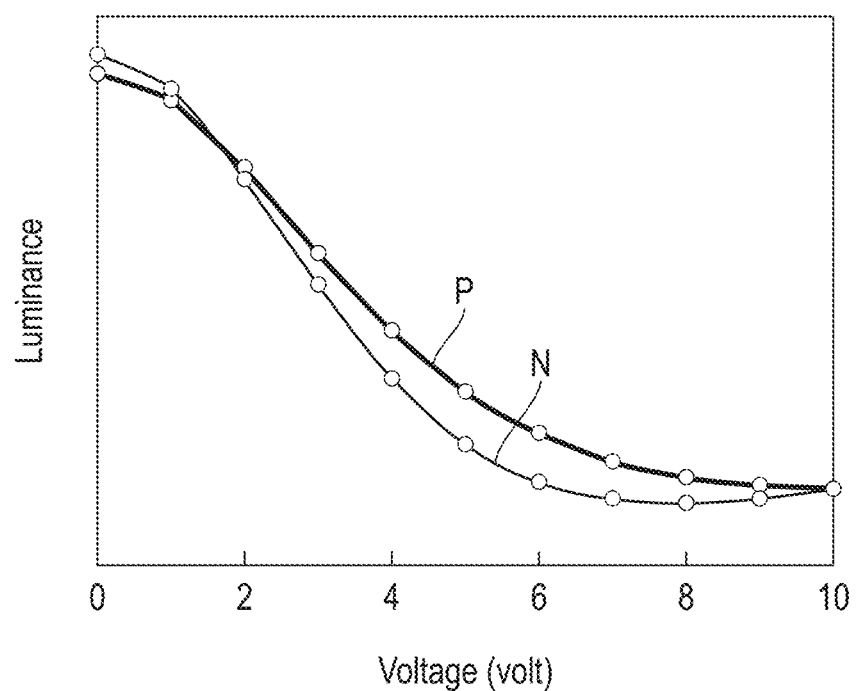
FIG. 21 is a diagram showing simulation results of the relationship between a voltage applied to a liquid crystal layer LC and luminance.

FIG. 21 is a diagram showing simulation results of the relationship between a voltage applied to the liquid crystal layer LC and luminance. The horizontal axis in the figure represents an applied voltage and the vertical axis in the figure represents luminance.

The simulation conditions will be explained here. An upper polarizer was disposed on the front surface side of the liquid crystal cell for testing (side opposite to the first substrate), and a lower polarizer was disposed on the back surface side of the liquid crystal cell (side opposite to the second substrate).

In the case where the positive liquid crystal materials were applied, the transmission axis of the upper polarizer was parallel to the second direction Y, and the transmission axis of the lower polarizer was set to a direction rotated 10° with respect to the first direction X. The initial alignment direction of the liquid crystal molecules was parallel to the transmission axis of the lower polarizer.

In the case where the negative liquid crystal materials were applied, the transmission axis of the upper polarizer was parallel to the first direction X, and the transmission axis of the lower polarizer was set to a direction rotated 10° with respect to the second direction Y. The initial alignment direction of the liquid crystal molecules was parallel to the transmission axis of the lower polarizer.

Then, the luminance of light transmitted through the upper polarizer when the liquid crystal cell was illuminated from the lower polarizer side was calculated. P in the figure represents a result in the case where the positive liquid crystal materials were applied, and N in the figure represents a result in the case where the negative liquid crystal materials were applied.

When no voltage was applied to the liquid crystal layer LC, the initial alignment direction of the liquid crystal molecules was deviated 10° from the absorption axis of the upper polarizer, and thus light escaped from the upper polarizer. As a voltage was applied to the liquid crystal layer LC, the angle formed by the major axes of the liquid crystal molecules and the absorption axis of the upper polarizer gradually became smaller and the luminance declined. As shown in the figure, it has been confirmed that in the case (N) where the negative liquid crystal materials were applied, compared to those in the case (P) where the positive liquid crystal materials were applied, a small number of liquid crystal molecules rose and a desired liquid crystal alignment state was obtained, and therefore, the luminance sufficiently declined with a lower voltage.

According to the above simulation results, the application of negative liquid crystal materials is appropriate for the liquid crystal layers LC of the polarization conversion elements 1 of the embodiments, in light of the fact that a desired liquid crystal alignment state is easily obtained. However, it is not that positive liquid crystal materials are inappropriate, but that in the embodiments, both the negative liquid crystal materials and the positive liquid crystal materials are applicable.

Application Example

FIG. 22 is a diagram for explaining an application example of the polarization conversion element 1. An alignment treatment device 100 which subjects an alignment film to optical alignment treatment will be described here. The alignment treatment device 100 comprises a stage 101 on which an object 110 is placed, a holder 102 which holds the polarization conversion element 1, an ultraviolet light source 103 which emits polarized ultraviolet rays UV, and a driver 104 which drives the polarization conversion element 1.

The object 110 comprises a support substrate 111 and an alignment film 112 disposed on the support substrate 111.

In the above-described alignment treatment device 100, the polarization conversion element 1 described in the above first or second embodiment is applied as a mask. Of the polarization conversion element 1, the second outer surface 20B, which corresponds to a plane of incidence, is opposed to the ultraviolet light source 103, and the first outer surface 10B, which corresponds to a plane of emission, is opposed to the object 110.

Polarized ultraviolet rays UV emitted from the ultraviolet light source 103 are transmitted through the polarization conversion element 1, thereby being converted into rays having a polarization axis in a desired direction and radiated to the alignment film 112. The stage 101 moves in a direction indicated by arrow A in the figure, and polarized ultraviolet rays UV are thereby radiated to the entire surface of the object 110.

FIG. 23 is a diagram showing an example of the object 110 subjected to alignment treatment by the alignment treatment device 100 shown in FIG. 22. The alignment film 112 has different alignment treatment directions AD in a plane. The alignment treatment directions AD here correspond to, for example, the distribution of the polarization axes of linearly polarized light L1 described with reference to FIG. 4. That is, the distribution of the liquid crystal molecules LM1 in the polarization conversion element 1 is transferred as the alignment treatment directions AD.

In this manner, the alignment treatment device 100, to which the polarization conversion element 1 is applied as a mask, can easily form the alignment film 112 having the distribution of the alignment treatment directions AD different in a plane.

As described above, the embodiments can provide a polarization conversion element which transmit light having a polarization axis in a desired direction in a plane.

The present invention is not limited to the embodiments described above but the constituent elements of the invention can be modified in various manners without departing from the spirit and scope of the invention. Various aspects of the invention can also be extracted from any appropriate combination of a plurality of constituent elements disclosed in the embodiments. Some constituent elements may be deleted in all of the constituent elements disclosed in the embodiments. The constituent elements described in different embodiments may be combined arbitrarily.

What is claimed is:

1. A polarization conversion element comprising:
a first substrate comprising a first transparent substrate having a first inner surface and a first outer surface, a first plane electrode disposed on the first inner surface, a first insulating film covering the first plane electrode, a first control electrode disposed on the first insulating film, and a first alignment film covering the first control electrode;
a second substrate comprising a second transparent substrate having a second inner surface and a second outer surface, and a second alignment film; and
a liquid crystal layer disposed between the first substrate and the second substrate, wherein
the first control electrode comprises a first strip electrode, a second strip electrode separated from the first strip electrode, a third strip electrode separated from the first strip electrode and the second strip electrode, and a first common electrode formed in strip and connected to one end side of each of the first to third strip electrodes,
the first strip electrode and the first common electrode are orthogonal to each other,
the second strip electrode is located between the first strip electrode and the third strip electrode,
respective extension directions of the first to third strip electrodes are different from each other,
an angle formed by the extension direction of the first strip electrode and the extension direction of the third strip electrode is greater than an angle formed by the extension direction of the first strip electrode and the extension direction of the second strip electrode,
the second substrate further comprises a second plane electrode disposed on the second inner surface, a second insulating film covering the second plane electrode, and a second control electrode disposed on the second insulating film and covered by the second alignment film,
the second control electrode comprises strip electrodes and a second common electrode formed in strip and connected to one end side of each of the strip electrodes, and
respective extension directions of the strip electrodes are parallel to the extension direction of the first strip electrode.

2. The polarization conversion element of claim 1, wherein a distance between the first strip electrode and the second strip electrode and a distance between the second strip electrode and the third strip electrode become greater in a direction away from the first common electrode.

3. The polarization conversion element of claim 1, wherein
the first control electrode comprises:
a first electrode group including first strip electrodes; and
a second electrode group including the second strip electrode and a fourth strip electrode parallel to the second strip electrode, and
the fourth strip electrode is adjacent to the first electrode group and is connected to one of the first strip electrodes.

4. The polarization conversion element of claim 1, wherein
the first control electrode comprises:
a second electrode group including second strip electrodes; and
a third electrode group including the third strip electrode and a fifth strip electrode parallel to the third strip electrode, and
the fifth strip electrode is adjacent to the second electrode group, and is separated from all strip electrodes of the second electrode group.

5. The polarization conversion element of claim 1, wherein
the first control electrode comprises:
a second electrode group including the second strip electrode and a sixth strip electrode parallel to the second strip electrode; and
a third electrode group including the third strip electrode and a seventh strip electrode parallel to the third strip electrode,
one end side of the sixth strip electrode is connected to the first common electrode, and
the other end side of the sixth strip electrode is connected to one end side of the seventh strip electrode.

6. The polarization conversion element of claim 1, wherein
the first control electrode comprises:
a second electrode group including the second strip electrode and an eighth strip electrode parallel to the second strip electrode; and
a third electrode group including the third strip electrode and a ninth strip electrode and a tenth strip electrode which are parallel to the third strip electrode,
one end side of the eighth strip electrode is connected to the first common electrode,
the other end side of the eighth strip electrode is connected to one end side of the ninth strip electrode, and
one end side of the tenth strip electrode is connected to a middle portion of the eighth strip electrode.

7. The polarization conversion element of claim 1, wherein the liquid crystal layer has negative dielectric anisotropy and includes a liquid crystal molecule initially aligned in the extension direction of the first strip electrode.

8. The polarization conversion element of claim 1, wherein the liquid crystal layer has positive dielectric anisotropy, and includes a liquid crystal molecule initially aligned in an extension direction of the first common electrode.

9. A polarization conversion element comprising:
a first substrate comprising a first transparent substrate having a first inner surface and a first outer surface, a first plane electrode disposed on the first inner surface, a first insulating film covering the first plane electrode, a first control electrode disposed on the first insulating film, and a first alignment film covering the first control electrode;
a second substrate comprising a second transparent substrate having a second inner surface and a second outer surface, and a second alignment film; and
a liquid crystal layer held between the first substrate and the second substrate, wherein
in an on state where a potential difference arises between the first plane electrode and the first control electrode, the liquid crystal layer comprises a first area including a liquid crystal molecule aligned twistedly clockwise and a second area including a liquid crystal molecule aligned twistedly counterclockwise in an area where the first plane electrode and the first control electrode overlap,
the first control electrode comprises a strip electrode extending over the first area and the second area and formed in an arcuate shape,
the second substrate further comprises a second plane electrode disposed on the second inner surface, a second insulating film covering the second plane electrode, and a second control electrode disposed on the second insulating film and covered by the second alignment film, and
the second control electrode comprises a strip electrode extending over the first area and the second area and formed straight.

10. The polarization conversion element of claim 9, wherein
the first area and the second area are arranged in a first direction, and
the liquid crystal layer has negative dielectric anisotropy, and includes a liquid crystal molecule initially aligned in the first direction.

11. The polarization conversion element of claim 9, wherein
the first area and the second area are arranged in a first direction, and
the liquid crystal layer has positive dielectric anisotropy, and includes a liquid crystal molecule initially aligned in a second direction orthogonal to the first direction.

12. The polarization conversion element of claim 1, wherein
the second outer surface is a plane of incidence of linearly polarized light, and
the first outer surface is a plane of emission of linearly polarized light.

13. The polarization conversion element of claim 1, wherein in an on state where a potential difference arises between the first plane electrode and the first control electrode, the liquid crystal layer is configured to rotate a polarization axis of linearly polarized light incident from the second outer surface.

14. The polarization conversion element of claim 9, wherein
the second outer surface is a plane of incidence of linearly polarized light, and
the first outer surface is a plane of emission of linearly polarized light.

* * * * *